Aug. 7, 1923.

J. H. HAMMOND, JR 1,463,994

SYSTEM FOR THE TRANSMISSION AND RECEPTION OF RADIANT ENERGY

Original Filed Feb. 15, 1918   9 Sheets-Sheet 1

WITNESS:
Chas. J. Clagett

INVENTOR
John Hays Hammond Jr.
BY
A. J. Gardner
HIS ATTORNEY

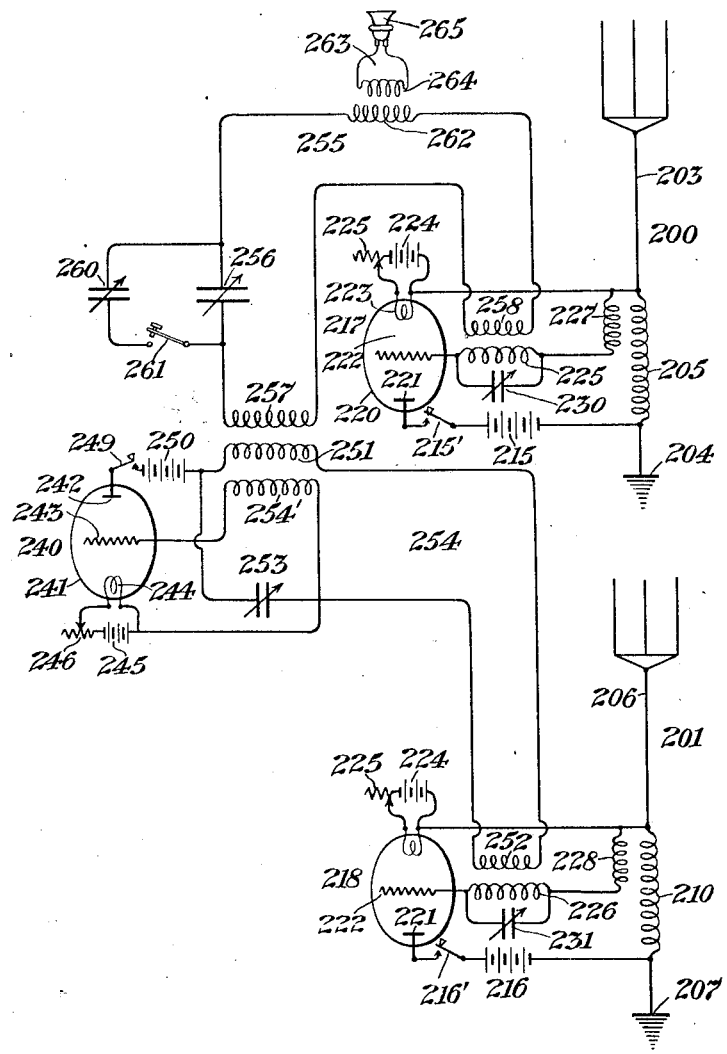

Aug. 7, 1923.

J. H. HAMMOND, JR 1,463,994

SYSTEM FOR THE TRANSMISSION AND RECEPTION OF RADIANT ENERGY

Original Filed Feb. 15, 1918   9 Sheets-Sheet 3

Aug. 7, 1923.

J. H. HAMMOND, JR 1,463,994

SYSTEM FOR THE TRANSMISSION AND RECEPTION OF RADIANT ENERGY

Original Filed Feb. 15, 1918   9 Sheets-Sheet

WITNESS
Chas F. Clagett

INVENTOR
John Hays Hammond Jr.
BY
A. J. Gardner
HIS ATTORNEY

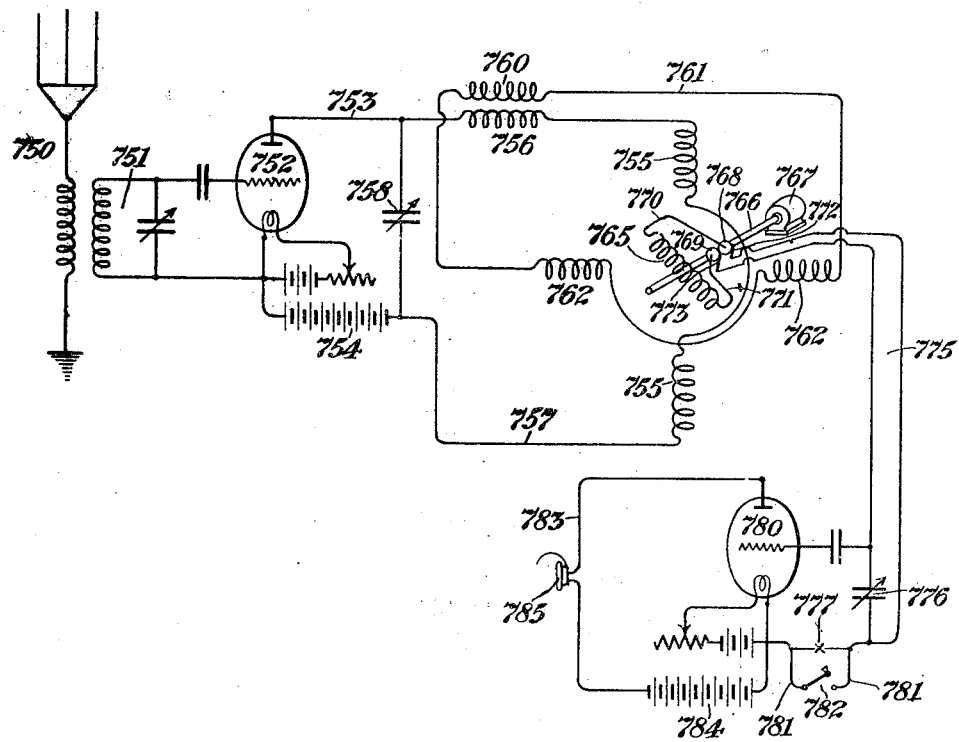

Patented Aug. 7, 1923.

1,463,994

UNITED STATES PATENT OFFICE.

JOHN HAYS HAMMOND, JR., OF GLOUCESTER, MASSACHUSETTS.

SYSTEM FOR THE TRANSMISSION AND RECEPTION OF RADIANT ENERGY.

Application filed February 15, 1918, Serial No. 217,425. Renewed October 31, 1922. Serial No. 598,208.

*To all whom it may concern:*

Be it known that I, JOHN HAYS HAMMOND, Jr., a citizen of the United States, and resident of Gloucester, in the county of Essex, State of Massachusetts, have invented certain new and useful Improvements in Systems for the Transmission and Reception of Radiant Energy, of which the following is a specification.

Some of the objects of this invention are: to provide a group transmission system of radiant energy; to provide an improved receiving system for radiant energy; to provide an improved method for the transmission of radiant energy; to provide an improved system for the transmission of radiant energy whereby secrecy of operation may be maintained and interference may be avoided; and to provide a selective system for the transmission of radiant energy wherein a plurality of wave trains or series of waves are simultaneously emitted in such a manner that there will be a predetermined difference in phase relationship between different series or trains of waves, and wherein the plurality of series or trains of waves are selectively received by a receiving system in such a manner that a receiving device, forming part of the receiving system, is caused to operate only as a result of the predetermined difference in phase of the received waves.

Figure 1:
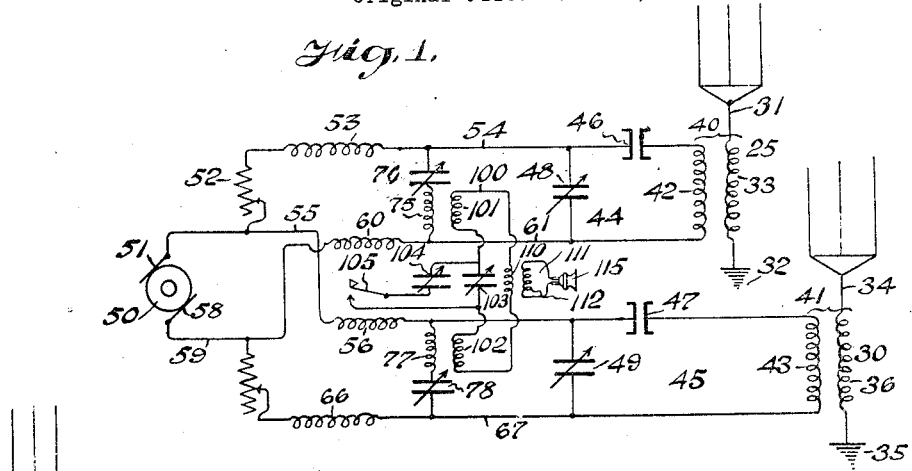
Figure 4:
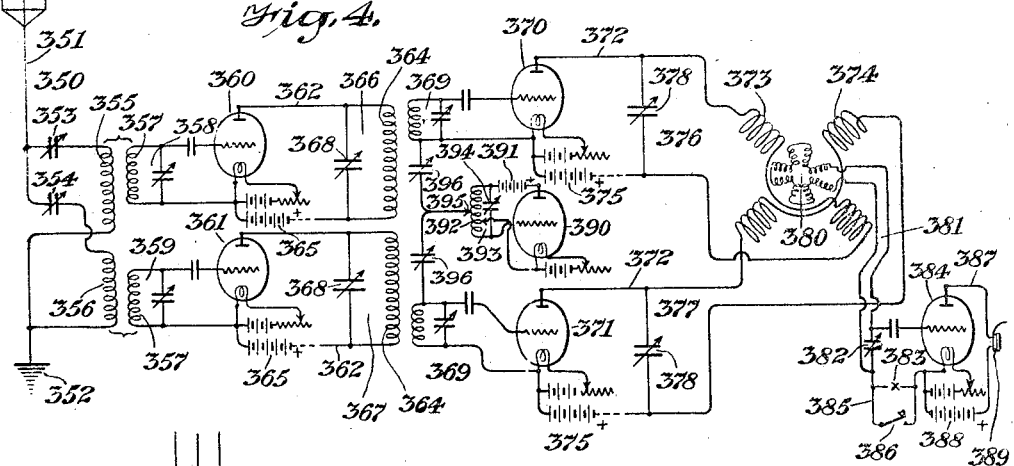
Figure 3:
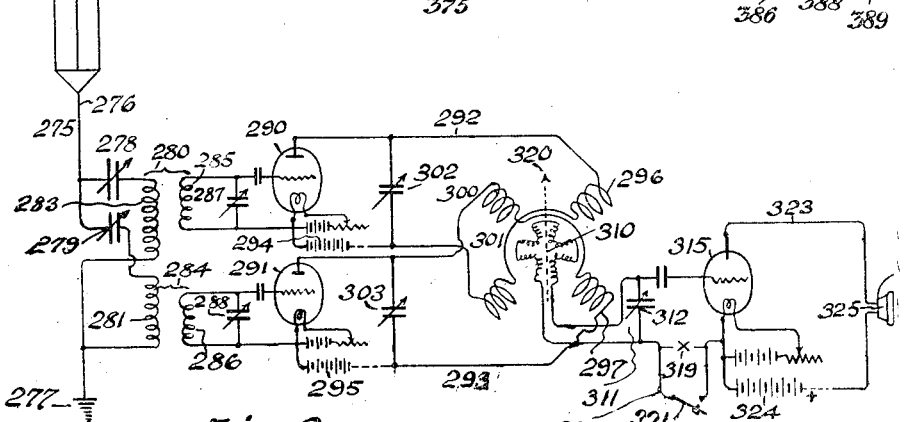
Figure 5:
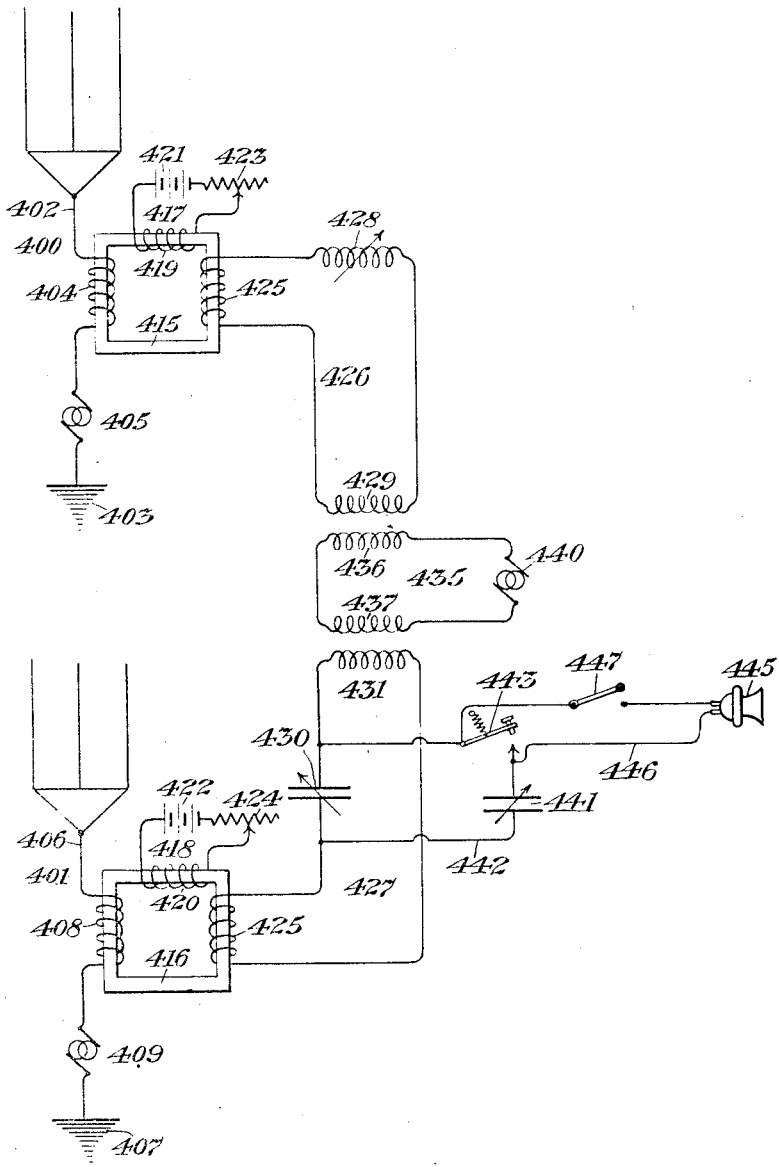
Figure 6:
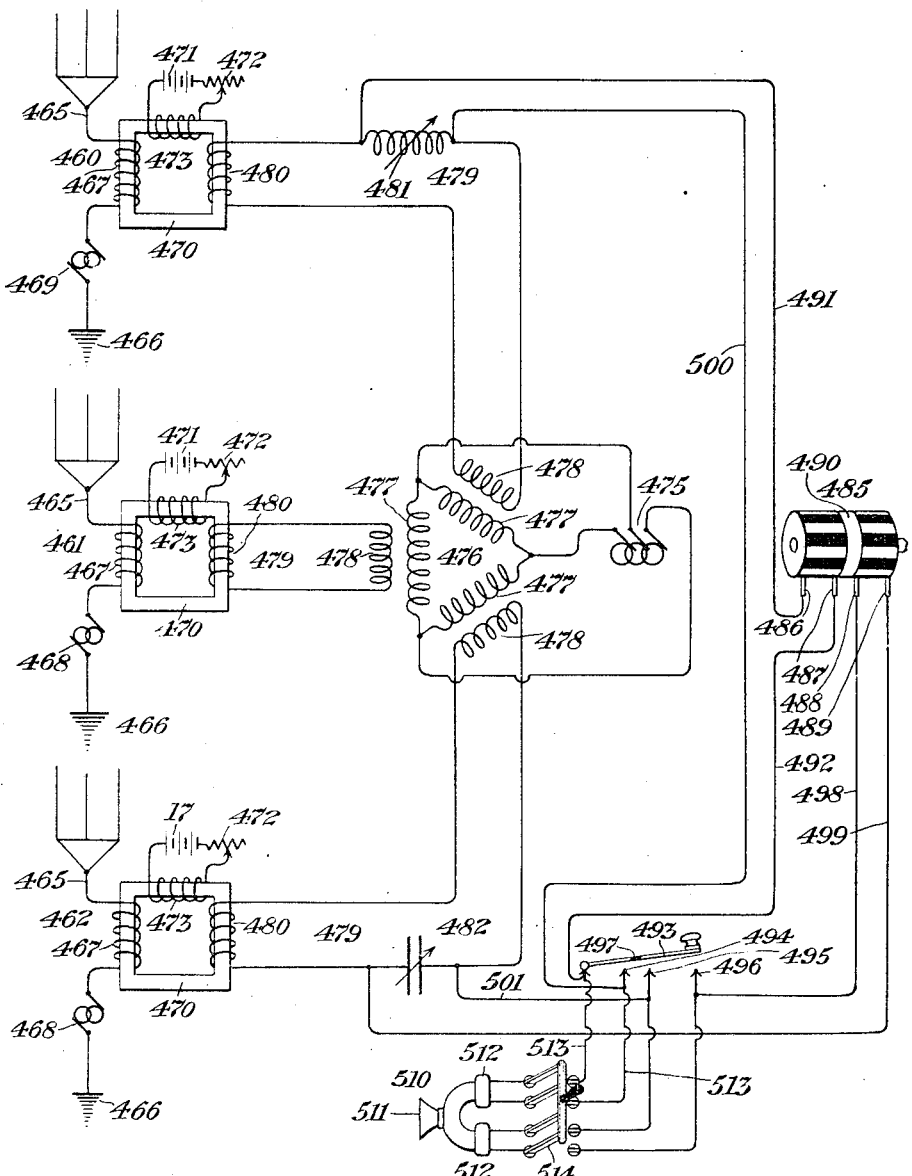
Figure 7:
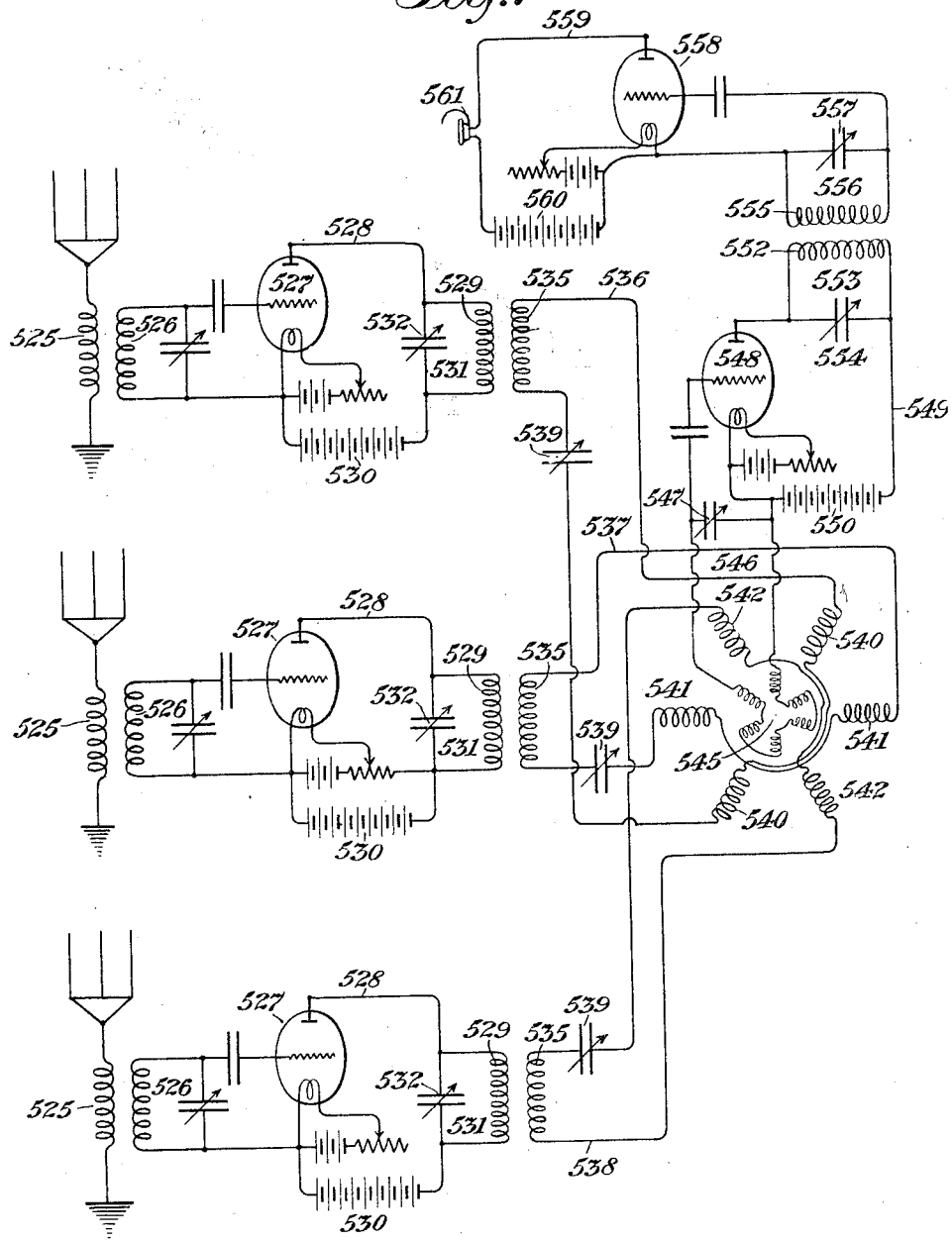
Figure 8:
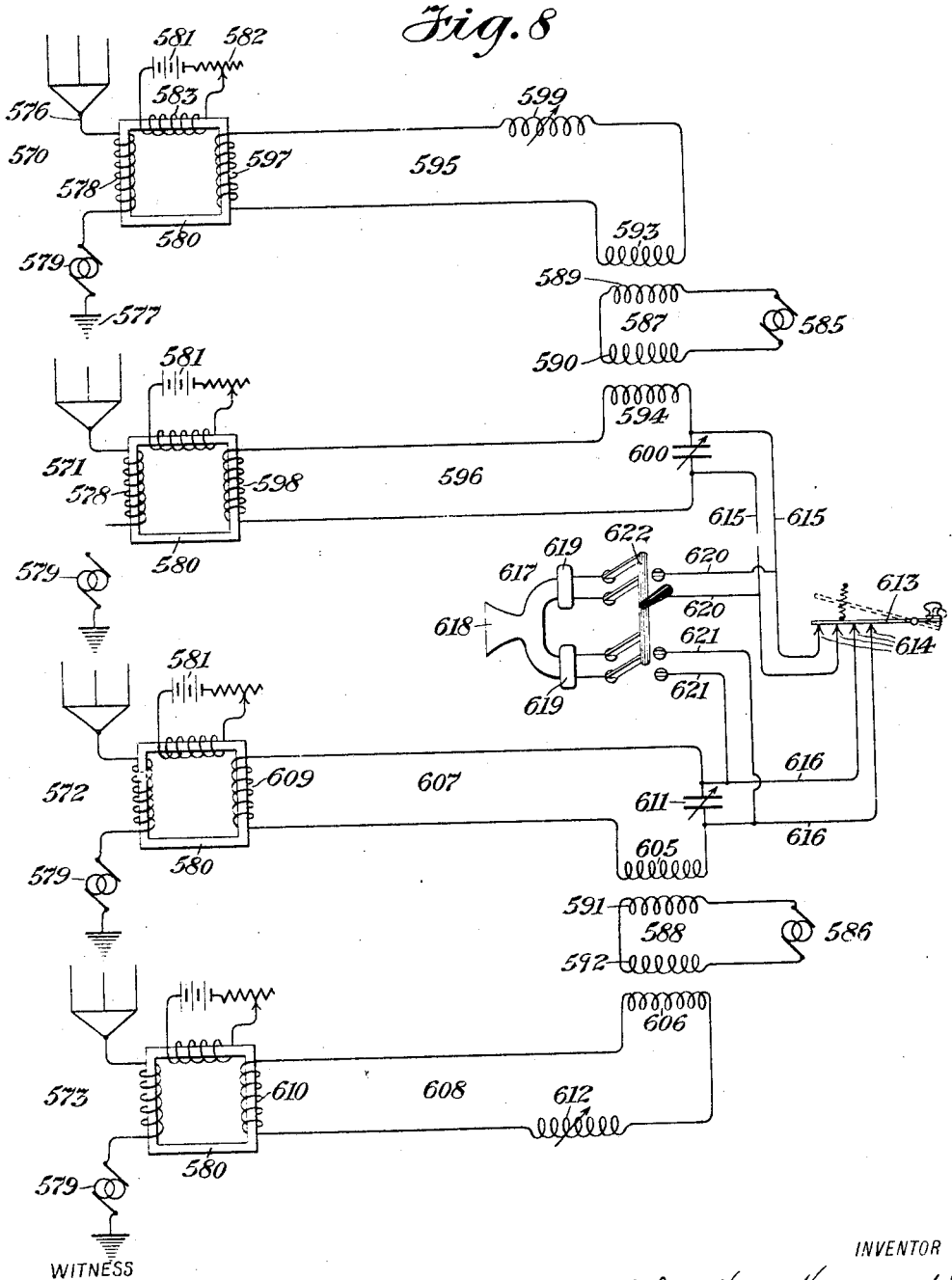
Figure 9:
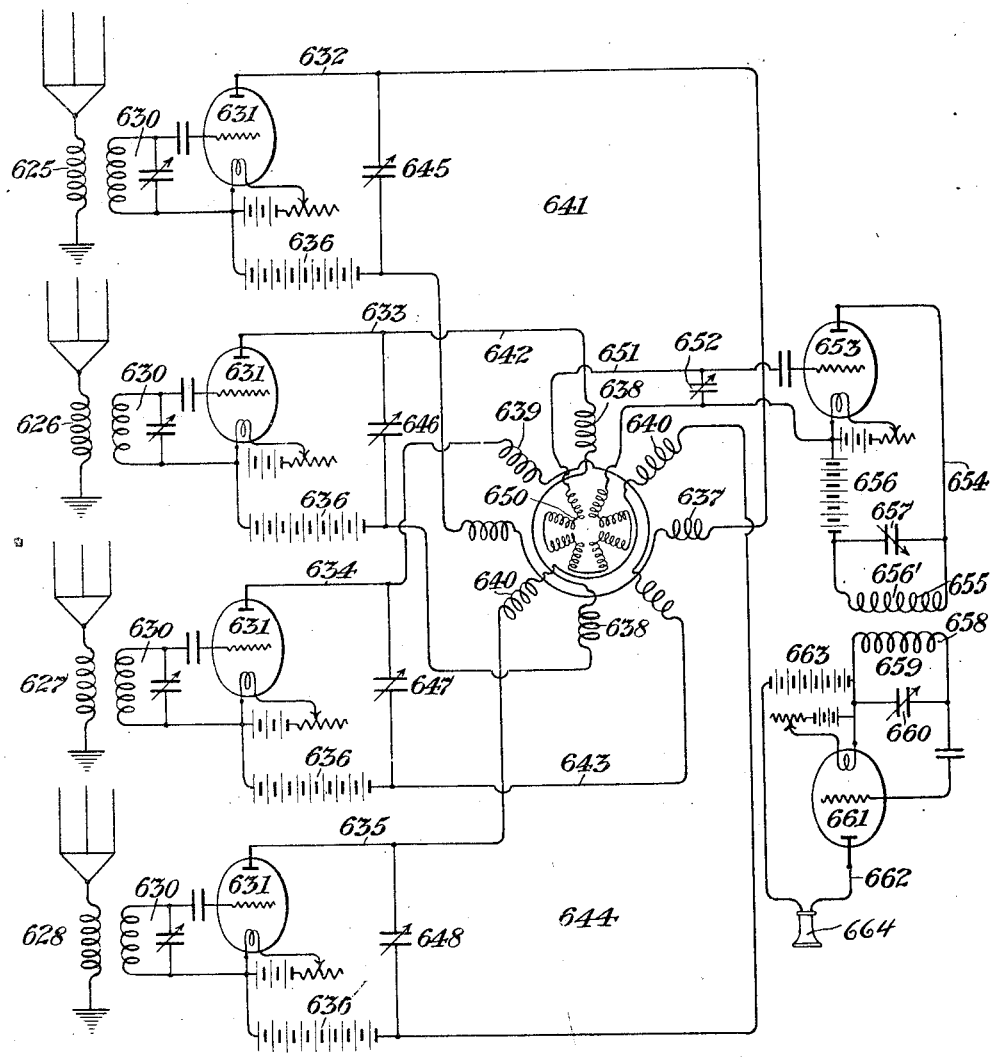
Figure 10:
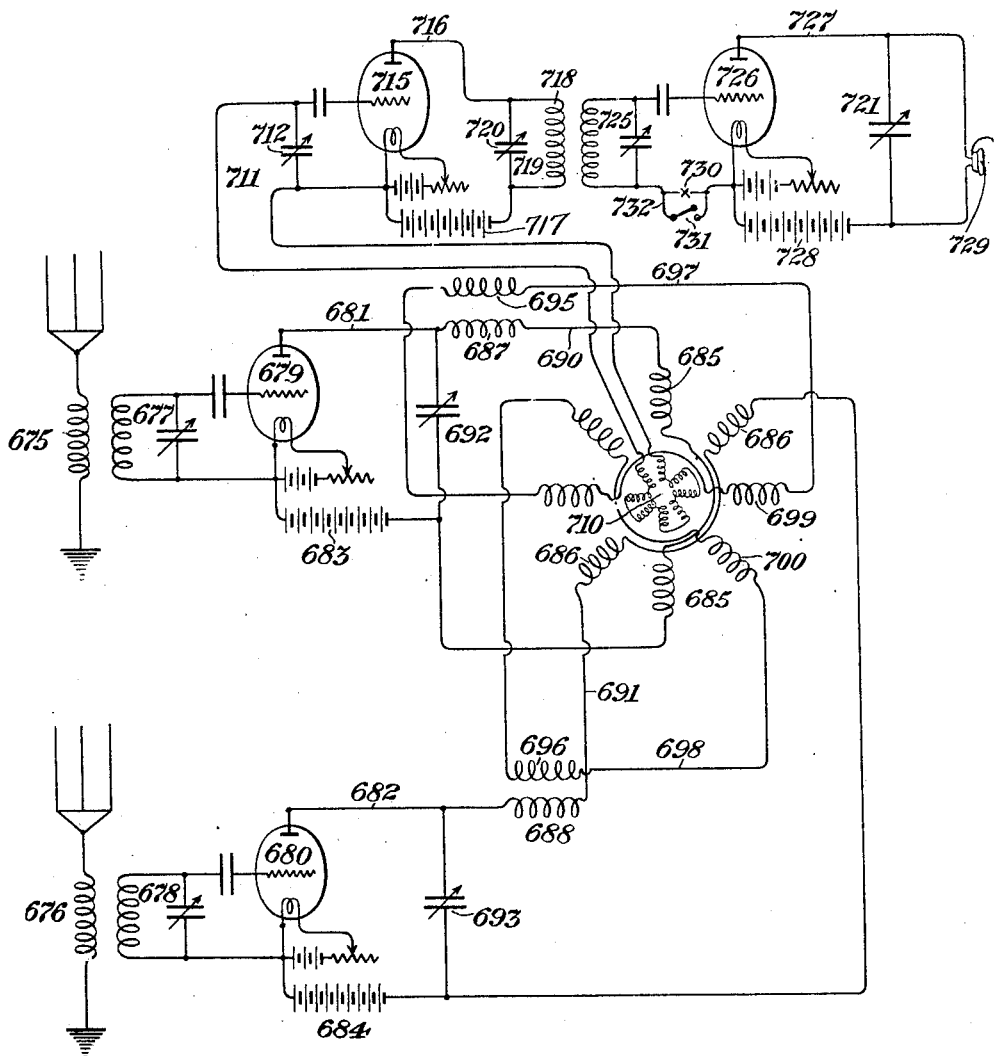

In the accompanying drawings, all of which are diagrammatic views of systems constructed in accordance with this invention, Figs. 1 and 2 are views respectively of two different forms of transmission systems; Figs. 3 and 4 are views respectively of two different forms of receiving systems, either of which is adapted to be used in connection with either of the forms of transmission systems shown in Figs. 1 and 2; Fig. 5 is a view of a modified form of transmission system; Fig. 6 is a view of a further modified form of transmission system; Fig. 7 is a view of a receiving system adapted to be used in connection with the transmission system shown in Fig. 6; Fig. 8 is a view of a further modified form of transmission system; Fig. 9 is a view of a receiving system adapted to be used in connection with the transmission system shown in Fig. 8; Fig. 10 is a view of a modified form of receiving system; and Fig. 11 is a view of a further modified form of receiving system.

Referring to the drawings and particularly to Fig. 1, one form of transmission system constructed in accordance with this invention comprises two open aerial circuits 25 and 30, arranged to emit respectively two series or trains or high frequency oscillations of different frequencies respectively, for instance, of 300,000 per second and 250,000 per second, respectively. These two open aerial circuits 25 and 30 include respectively an antenna 31, grounded as at 32 through an inductance 33, and an antenna 34, grounded as at 35 through an inductance 36. The two inductances 33 and 36 form the secondaries of two transformers 40 and 41, which include respectively two primary coils or inductances 42 and 43, which are arranged respectively in the two closed oscillatory circuits 44 and 45, which include respectively two spark gap devices 46 and 47, and two variable condensers 48 and 49. These two closed oscillatory circuits 44 and 45 are adjusted in a well-known manner in relation to their respective open aerial circuits 25 and 30 to cause the open aerial circuits 25 and 30 to be effectively stimulated by them. The two variable condensers 48 and 49 are arranged to be charged from any suitable source of direct current of high voltage, as, for instance, from a direct current generator 50 giving a potential of about 500 volts, one brush 51 of this generator being connected through a rheostat 52, choke coil 53 and conductor 54 to one side of the variable condenser 48, and through a branch conductor 55, choke coil 56 and conductor 57 to one side of the variable condenser 49. The other brush 58 of the generator 50 is connected through a conductor 59, choke coil 60 and conductor 61 to the other side of the variable condenser 48, and through a rheostat 65, choke coil 66 and conductor 67 to the other side of the variable condenser 49.

For simultaneously impressing upon the two series of high frequency waves of oscillations emitted by the open aerial circuits 25 and 30, respectively, two series of periodic amplitude variations having the same frequencies respectively, for instance, of 20,000 per second, two secondary frequency imposing devices or tone circuits comprising respectively an inductance 75 and a variable condenser 76 in series therewith, and an inductance 77 and a variable condenser 78 in series therewith are shunted respectively about the two variable condensers 48 and 49.

For producing a predetermined phase relationship between the two series of periodic amplitude variations, the two tone circuits 75, 76 and 77, 78 are operatively connected by an intermediate circuit 100, which includes two coils 101 and 102, and a primary variable condenser 103. Shunted around the primary condenser 103 is a secondary variable condenser 104, which is provided with a key 105 whereby the condenser 104 will be thrown into operation. The two coils 101 and 102 are inductively connected respectively to the two coils 75 and 77 of the two tone circuits. This intermediate circuit 100 may be adjusted by varying the various elements of this circuit and by varying the coupling between the coils between the intermediate circuit and the tone circuits so that when the switch 105 is closed a predetermined difference in phase, for instance, of 90° will be produced between the two series of periodic amplitude variations of the emitted waves.

To adapt the transmission system shown in Fig. 1 to be used for transmitting telephonic messages, a coil 110 may be included in the intermediate circuit 100, and an auxiliary circuit 111, including a coil 112 and a telephone transmitter or microphone 115 may be arranged so that the coil 112 of the auxiliary circuit will be acted upon inductively by and will react inductively upon the coil 110 of the intermediate circuit 100. In this arrangement, when the switch 105 is closed and the operator speaks into the telephone transmitter 115, the interaction between the two tone circuits 75, 76, and 77, 78 through the intermediate circuit 100 will be modified in such a manner that the phase difference between the two series of periodic amplitude variations of the system will be varied in accordance with the sound waves received by the telephone transmitter 115.

In the operation of the transmission system shown in Fig. 1, with the switch 105 closed and the generator 50 in operation, the two open aerial circuits 25 and 30 will be caused to emit two continuous series of electro-radiant waves having wave frequencies of, for instance, 300,000 and 250,000 per second respectively. The amplitude of each of these series of waves will be periodically varied in a uniform manner and at a predetermined frequency, the frequency of these periodic modifications in amplitude being the same in both series of waves emitted, and as a result of the interaction between the two tone circuits 75, 76 and 77, 78 and the intermediate circuit 100, the difference in phase between these two periodic modifications will be, for instance, substantially 90°. When the switch 105 is open, the variable condenser 104 will be cut out of operation and consequently the interaction between the two tone circuits 75, 76 and 77, 78 through the intermediate circuit 100 will be varied and will decrease the phase difference between the two series of periodic amplitude variations from 90° to 0°, so that the two series of amplitude variations will be in the same phase. These two series of emitted waves thus periodically modified in amplitude may be selectively received upon any suitable receiving system, as will be hereinafter described.

The modified transmission system shown in Fig. 2 comprises a main open aerial circuit 200 and an auxiliary open aerial circuit 201, which include respectively an antenna 203 grounded as at 204 through a coil or inductance 205, and an antenna 206 grounded as at 207 through a coil 210. The two open aerial circuits 200 and 201 are arranged to be energized respectively by two high potential batteries 215 and 216, or other suitable source of high potential direct current, which are arranged to act respectively through two electrionic or thermionic valves 217 and 218, which are in series respectively with the two batteries 215 and 216, and in shunt circuits controlled respectively by switches 215' and 216' around the two coils 205 and 210 of the two open circuits 200 and 201 respectively. Each of these valves 217 and 218 comprises an evacuated glass bulb, or other suitable container, 220, in which is arranged a plate electrode 221, a grid 222, and a filament 223, which is arranged to be heated by a battery 224 acting through a rheostat 225. The two grids 222, 222 are connected to their respective open circuits by two corresponding circuits including respectively two inductances 225 and 226, and two auxiliary coils 227 and 228. The coil 227 is inductively and adjustably coupled to the coil 205, and the coil 228 is inductively and adjustably coupled to the coil 210. Shunted around the two inductances 225 and 226 respectively are two variable condensers 230 and 231.

In the arrangement thus far described, when the switches 215' and 216' are closed, the thermionic valves 217 and 218 will be caused to operate through the energy supplied by the batteries 215 and 216 to cause the open circuits 200 and 201 to emit respectively two continuous series of electro-radiant oscillations having respectively frequencies predetermined by the electrical length of the two circuits. These two open circuits 200 and 201 are tuned to oscillate respectively at different frequencies, for instance, of 300,000 and 250,000 oscillations per second.

For impressing upon the two series of high frequency oscillations emitted by the two open circuits 200 and 201, respectively, two series of periodic amplitude variations having the same frequency, for instance, of 20,000 variations per second, an auxiliary thermionic valve 240, of any well-known or suitable construction, is provided. In the form shown, this auxiliary valve 240 includes an evacuated glass bulb 241, or other suitable container, in which is arranged a plate electrode 242, a grid 243, and a filament 244. The filament 244 is arranged to be heated by a battery 245 acting through a rheostat 246. The auxiliary valve 240 is in a circuit controlled by a switch 249 and including a high potential battery 250, or other source of high potential, a main inductance 251, and an auxiliary inductance 252. A variable condenser 253 is shunted around these two inductances 251 and 252, and is thus arranged in a closed auxiliary circuit 254 containing these inductances. This closed circuit 254 is adjusted so that its own free period of oscillation will be equal to the period of amplitude variations which it is desired to impress upon the emitted high frequency wave. The auxiliary inductance 252 of this closed circuit is arranged to act inductively upon the main inductance 226 of the thermionic valve 218, which is connected to the auxiliary open circuit 201. The grid 243 is in a circuit including a coil 254', which is inductively coupled to the main inductance 251 to be reacted upon by the current in the auxiliary circuit 254. The thermionic valve 240 is inductively connected with the thermionic valve 217, which controls the main open circuit 200, by means of a closed oscillatory circuit 255, which contains a variable condenser 256, a main inductance 257, and a secondary inductance 258. A variable condenser 260 is arranged to be shunted around the variable condenser 256 and is controlled by a switch 261 which is arranged to control the variable condenser 260 and which allows operation at the will of an operator. The main inductance 257 of the intermediate circuit 255 is inductively coupled to the main inductance 251 of the circuit of the auxiliary valve 240, and the secondary inductance 258 of the intermediate circuit 255 is inductively coupled to the inductance 225 of the thermionic valve 217 of the main open circuit 200. The variable condenser 256 of the intermediate circuit 255 may be adjusted to give a desired phase relation between the series of periodic amplitude variations emitted by the main open circuit 200 and the series of periodic amplitude variations emitted by the secondary circuit 201. The arrangement is such that when the switch 261 is closed, the variable condenser 256 may be adjusted to produce a phase difference, for instance, of 90° betwen these two series of periodic amplitude variations.

To adapt the transmission system shown in Fig. 2 to be used for transmitting telephonic messages, a coil 262 may be included in the intermediate circuit 255 and an auxiliary circuit 263 including a coil 264 and a telephone transmitter or microphone 265 may be arranged so that the coil 264 of the auxiliary circuit 263 will be acted upon inductively by and will react inductively upon the coil 262 of the intermediate circuit 255. In this arrangement, when the switch 261 is closed and the operator speaks into the telephone transmitter 265, the operation of the intermediate circuit 255 will be modified in such a manner that the phase difference between the two series of periodic amplitude variations of the system will be varied in accordance with the sound waves received by the telephone transmitter 265.

In the operation of the transmission system shown in Fig. 2, when the switches 215', 216', 249 and 261 are closed, the two open aerial circuits 200 and 201 will be caused to emit two continuous series of electro-radiant waves having frequencies of, for instance, 300,000 and 250,000 per second respectively, and periodic variations in the amplitude of these two series of waves will be effected as a result of the operation of the auxiliary valve 240 acting through the auxiliary circuit 254 and through the intermediate circuit 255, the frequency of these amplitude variations being the same in both series of waves, for instance, 20,000 variations per second. These two series of amplitude variations will have a difference in phase of, for instance, 90°, depending upon the adjustment of the variable condenser 256. When the switch 261 is open, this phase difference will be modified to such an extent as to render the system ineffective, as will appear hereinafter.

In Fig. 3 is shown one form of receiving system constructed in accordance with this invention which may be utilized to receive waves transmitted from either of the transmission systems shown in Figs. 1 and 2, or from any other similar or suitable transmission system. This form of receiving system comprises a divided open aerial receiving circuit 275, including an antenna 276, which is grounded as at 277 through two branch circuits, including respectively two variable condensers 278 and 279 and two coils 280 and 281. The circuit comprising the antenna 276 and the branch circuit containing the condenser 278 and coil 280 is tuned to one of the high frequencies of the transmission system, for instance, to 300,000 oscillations per second, while the circuit comprising the antenna 276 and the other condenser 279 and the corresponding coil 281 is tuned to the other high frequency of the transmission system, for instance, to 250,000 oscillations per second. The two coils 280 and 281 form the primaries of two transformers 283 and 284, having secondary coils 285 and 286, which are inclosed oscillatory circuits 287 and 288, which are tuned respectively to the two high frequencies of the open receiving circuits, for instance, 300,000 per second and 250,000 per second, and which are arranged to control two detectors 290 and 291 of any well-known and suitable construction, for instance, as in the form shown, two gaseous detectors of well-known construction. These two detectors 290 and 291 are arranged to control two circuits 292 and 293, which include respectively two sources of high potential direct current, as, for instance, two high potential batteries 294 and 295, and two primary coils 296 and 297, which are arranged so that their longitudinal axes lie in the same plane and intersect at right angles. Each of these two primary coils 296 and 297 is arranged in two aligned spaced sections and these two primary coils 296 and 297 are arranged respectively in two closed oscillatory circuits 300 and 301 including respectively two variable condensers 302 and 303, which are shunted around the primary coils 296 and 297 respectively. These two closed circuits 300 and 301 are each tuned to the frequency of the amplitude variations of the transmission system, for instance, to 20,000 oscillations per second. Surrounded by the coil sections of the two primary coils 296 and 297 and in a plane therewith are eight secondary coils 310, which are arranged in series to radiate substantially from the point of intersection of the axes of the two primary coils 296 and 297. These secondary coils 310 are spaced equi-angularly around their center of radiation so that the longitudinal axes of the two primary coils 296 and 297 will respectively bisect the angles formed between corresponding consecutive secondary coils, as shown in the drawings. The two pairs of primary coils 296 and 297 correspond to the stator of a two phase induction motor, whose wound rotor is made up of windings 310. If only one phase is excited, as would be the case if detector 290 was responding to an interfering signal, an alternating magnetic field is set up between the two halves of coil 296. This field cuts four of the coils of the "rotor" 310, which are connected at their inner ends, so that the resulting induced, E. M. F.'s cancel in each adjacent pair of rotor coils, thus leaving detector 315 unaffected. The same is true for an incoming interfering signal received by detector 291 and a similar result would be produced if both detectors 290 and 291 were simultaneously subjected to an interfering signal. However, if a signal is received from one of the above described transmitters, which are capable of emitting waves whose phase difference is 90°, the two magnetic fields set up between the halves of coils 296 and 297 will differ in phase by 90°, the result being, the well known rotating magnetic field of, say, the induction motor.

The action of this rotating field upon the secondary, or rotor coils 310, can best be understood by imagining the field coils 296 and 297 to actually rotate in the plane of the paper. Suppose these be rotated 90°. The magnetic field between the halves of any pair of coils, say coils 296, will now cut four different rotor coils, each pair of which are connected together at their outer ends, and in such a manner that the induced E. M. F.'s add. It is to be remembered, that, as mentioned above, in rotor coils connected together at their inner ends, the induced E. M. F.'s oppose. Thus a voltage will be generated in rotor 310 by the alternating field, when displaced from the position shown in the drawing (Fig. 3). Instead of actually moving the field coils 296 and 297, their resultant magnetic field rovolves, inducing thereby a voltage in coils 310 of the same frequency, as that supplied to the field coils 296 and 297. The secondary coils 310 are in a closed oscillatory circuit 311, which includes a variable condenser 312 and which is tuned to the secondary frequency of the system multiplied by the number of coils, for instance, to 160,000 oscillations per second. This closed circuit 311 is arranged to control a gaseous detector 315, or any other suitable detector, through an interrupter 319. A shunt circuit 320, controlled by a switch 321, is provided around the interrupter 319 to render the interrupter either effective or non-effective at the will of the operator. The gaseous detector 315 is arranged to control a circuit 323 including a high potential battery 324, or other source of current, a telephone 325, or a relay, or any other well-known or suitable receiving instrument.

In the operation of the receiving system shown in Fig. 3, when two series of waves from the transmission system having wave frequencies of respectively 300,000 per second and 250,000 per second and periodic amplitude variations of 20,000 per second in each series are received by the open aerial circuit 275, the two detectors 290 and 291 are caused to operate so as to emit unidirectional current impulses through the two control circuits 292 and 293. These impulses will have a high frequency of 300,000 and 250,000 per second respectively in the two control circuits 292 and 293 and a secondary frequency of 20,000 per second in both these circuits. If, now, there should be a phase difference of substantially 90° in the periodic modifications of the two series of received waves, two series of electrical oscillations having substantially the same frequency and intensity but having a difference in phase of substantially 90° will be set up in the two coils 296 and 297. The result of the magnetic field of these two coils will be constant in strength and will rotate uniformly, making one complete revolution for each cycle of the secondary frequency of 20,000 per second. This rotating magnetic field will induce in the closed oscillatory circuit 311 containing the secondary coils 310 electrical oscillations having a frequency equal to the secondary frequency of the system. This oscillation of the closed circuit 311 will cause the operation of the detector 315 which will cause unidirectional impulses having a frequency of 20,000 per second.

When the receiving system shown in Fig. 3 is used to receive telegraphic signals, the switch 321 is left open to render the interrupter 319 effective and the interrupter is rotated at a constant rate to interrupt the circuit at, for instance, 1,000 interruptions per second, so that when the current impulses are set up in the controlled circuit 323, these impulses will be interrupted at the rate of 1,000 interruptions per second and the telephone 325 will be caused to emit a tone having 1,000 vibrations per second, and which will be audible.

When the system shown in Fig. 3 is used to receive telephonic messages, the switch 321 is closed to render the interrupter 319 ineffective, and the controlled circuit 323 will then remain unbroken, and the telephone receiver 325 will be caused to emit sound waves as a result of and corresponding to the variations of the phase difference between the two series of amplitude variations of the waves received by the system.

When a relay or other similar instrument is substituted in Fig. 3 for the telephone receiver 325, the switch 321 is kept closed, and when a wireless signal is being received unidirectional impulses will be set up in the circuit 323 as hereinbefore described, and as a result of these impulses the relay, or other similar instrument, will be operated.

In the case of static shocks or impulses acting upon the open aerial circuit 275 of the receiving system shown in Fig. 3, both of the controlled circuits 292 and 293, if affected, would be affected simultaneously, and hence would cause the circuits to oscillate, if at all, in the same phase. If currents of the same phase and intensity should pass through the coils 296 and 297, the resultant magnetic field would not rotate but would remain fixed midway between the axes of the two coils, and oscillations will not be set up in the closed circuit 311, and consequently the detector 315 and the controlled receiving instrument 325 will be practically unaffected.

In Fig. 4 is shown a modified form of receiving system arranged to operate with either of the transmission systems shown in Figs. 1 and 2, or with any other suitable transmission system. This modified form comprises a divided open aerial circuit 350 constructed as hereinbefore described and comprising an antenna 351 which is grounded as at 352 through two branch circuits including respectively two variable condensers 353 and 354, and two coils 355 and 356. The circuit through the antenna 351, condenser 353 and coil 355 is tuned to one of the high frequencies of the received waves, and the circuit through the antenna 351, condenser 354 and coil 356 is tuned to the other high frequency of the received waves. The coils 355 and 356 are inductively coupled respectively to two secondary coils 357 and 357, which are arranged respectively in two closed oscillatory circuits 358 and 359, which are tuned respectively to the corresponding circuits of the primary coils 355 and 356. These two closed circuits 358 and 359 are arranged to control two detectors 360 and 361 of any well-known or suitable construction, for instance, two gaseous detectors of well-known construction, which are arranged to control two circuits 362 and 362 containing respectively two coils 364 and 364 and two high potential batteries 365 and 365, or other suitable sources of high potential. The two coils 364 and 364 are arranged in two closed oscillatory circuits 366 and 367, which include respectively two variable condensers 368 and 368. These two closed circuits 366 and 367 are tuned to the secondary frequency of the received waves, for instance, to 20,000 oscillations per second, and are inductively coupled to two closed oscillatory circuits 369 and 369, which are tuned to the secondary frequency of the received waves, for instance, to 20,000 oscillations per second, and which are arranged to control two secondary detectors 370 and 371. The two secondary detectors 370 and 371 may be of any well-known or suitable construction, and in the form shown are gaseous detectors of well-known construction. These secondary detectors are arranged to control two circuits 372 and 372, which include respectively two primary coils 373 and 374, and two high potential batteries 375 and 375. The primary coils 373 and 374 are respectively in two closed oscillatory circuits 376 and 377, which include respectively two variable condensers 378 and 378. The two coils 373 and 374 are arranged so that their longitudinal axes lie in the same plane and intersect at right angles, and each of these coils is in the form of two aligned spaced sections. Surrounded by the coil sections of the two primary coils 373 and 374 and in a plane therewith are eight secondary coils 380 which are arranged to and radiate substantially from the point of intersection of the axes of the two primary coils 373 and 374. These secondary coils 380 are spaced equi-angularly around their center of radiation, so that the longitudinal axes of the two primary coils 373 and 374 will respectively bisect the angles formed between corresponding consecutive secondary coils, as shown in the drawings. The secondary coils 380 are in a closed oscillatory circuit 381, which includes a variable condenser 382, and which is arranged to control through an interrupter 383 a detector 384 of any suitable construction, for instance, a gaseous detector of well-known construction. A shunt circuit 385, controlled by a switch 386, is shunted around the interrupter 383 to render the interrupter either effective or non-effective at the will of the operator. The detector 384 is arranged to control a circuit 387 containing a high potential battery 388, or other source of high potential current, and a telephone 389, or other suitable receiving instrument or device.

When the system shown in Fig. 4 is used for receiving telegraphic messages, the switch 386 is kept closed and the interrupter 383 is arranged to be rotated at a uniform rate by a motor or any other suitable means (not shown) to interrupt the circuit periodically at a frequency, for instance, of 1,000 interruptions per second, so that when a signal is being received by the open circuit 350, an audible sound will be produced in the telephone 389.

For producing electrical beats in the two closed oscillatory circuits 369 and 369 controlling the secondary detectors 370 and 371, an electrical oscillator, including a thermionic valve 390 of any well-known or suitable construction, is provided. This valve is arranged to control a circuit including a battery 391 and a coil 392, which is in a closed oscillatory circuit 393, including a variable condenser 394. This closed circuit 393 is adjusted so that a predetermined number of oscillations per second will be set up in this closed circuit 393 as a result of the action of the valve 390. In the present case, this closed circuit is adjusted or tuned to produce, under the action of the valve 390, continuous oscillations of a frequency either of 1,000 per second above, or 1,000 per second below the secondary frequency of the system; in other words, to produce either 19,000 or 21,000 oscillations per second. The coil 392 is connected through a variable contact 395 and two variable condensers 396 and 396 with the two closed circuits 369 and 369 respectively. By this arrangement, oscillations having a frequency either of 19,000 or 21,000 per second will be superimposed in the closed circuits 369 and 369 on the oscillations of 20,000 per second which are produced in these circuits by the action of the received waves, and consequently electrical beats having a frequency of 1,000 per second will be produced in each of these two closed circuits 369 and 369. If the secondary oscillations of 20,000 per second in these two closed circuits 369 and 369 have a phase difference of 90°, the electrical beats set up as just described in these circuits will also have a phase difference of 90°.

In the operation of the receiving system shown in Fig. 4, the oscillatory circuits 376 and 377 controlled by the secondary detectors 370 and 371 are tuned to the beat frequency of the two closed circuits 369 and 369 of, for instance, 1,000 oscillations per second, and the closed circuit 381, controlling the final detector 389, is tuned to the beat frequency, for instance, to 1,000 oscillations per second. The remaining circuits are tuned as hereinbefore described. Now when two series of waves having high frequencies respectively of 300,000 and 250,000 oscillations per second and having imposed thereon periodic amplitude variations of 20,000 per second are received by the aerial circuit 350, corresponding oscillations are set up in the closed circuits 358 and 359, which act through the primary detectors 360 and 361 to set up oscillations having a secondary frequency of 20,000 per second in the closed circuits 366 and 367. These secondary oscillations produce corresponding oscillations in the closed circuits 369 and 369 which control the two secondary detectors 370 and 371. Electrical beats of 1,000 per second are then caused to be set up in the closed circuits 369 under the action of the thermionic valve 390. These beats act through the secondary detectors 370 and 371 to produce electrical oscillations of substantially the same frequency of 1,000 per second and of substantially the same intensity in the two closed circuits 376 and 377, but having a phase difference of 90°. The effect of these oscillations flowing through the two primary coils 373 and 374 will be to set up a magnetic field which will remain substantially constant in strength but which will rotate uniformly, making one complete revolution for each beat cycle of the beat frequency.

Electrical oscillations having the beat frequency will thus be set up in the closed circuit 381 containing the eight secondary coils 380, and these oscillations will act through the interrupter 383 and through the final detector 384 to produce unidirectional impulses through the controlled circuit 387, 388 through the telephone or other receiving instrument 389. Through the action of the interrupter 383, these impulses will be interrupted if desired to cause the telephone 389 to produce an audible sound or tone.

If, now, the operation of the transmission system should be modified so as to reduce the phase difference between the two series of amplitude variations to substantially zero, as by opening the switch 105 of Fig. 1, or the switch 261 of Fig. 2, then the magnetic field produced by the primary coils 373 and 374 in the receiving system would cease to rotate, and consequently little, if any, current would be set up in the closed circuit 381, and the receiving instrument 389 would cease to operate.

When the receiving system shown in Fig. 4 is used for receiving telephonic messages from a corresponding transmission system, such, for instance, as either of the transmission systems shown in Figs. 1 and 2, the switch 386 should be left closed to short-circuit the interrupter 383 of the receiving system, and the slight variations in the difference in phase of the two series of periodic amplitude variations of the received waves due to the action of the telephone transmitter 115 in Fig. 1, or 265 in Fig. 2, would slightly vary the action of the primary coils 373 and 374 accordingly and cause corresponding variations in the oscillations in the closed circuit 381 and consequently corresponding variations in the current in the controlled circuit 387. These variations in the current in the controlled circuit 387 would cause the telephone receiver 389 to emit sound waves corresponding to the sound waves acting upon the telephone transmitter 115 in Fig. 1, or 265 in Fig. 2, of the transmission system. When used for telephony, the beat frequency at the receiver is adjusted to a frequency substantially above audibility, for instance, to 10,000 cycles per second, instead of 1,000 cycles per second.

In Fig. 5 is shown a further modified form of transmission system constructed in accordance with this invention. This modified form comprises two open aerial circuits 400 and 401, which include respectively an antenna 402 grounded as at 403 through a coil 404 and an alternator 405, and an antenna 406 grounded as at 407 through a coil 408 and an alternator 409. These two open circuits 400 and 401 are tuned respectively to two different frequencies, for instance, to 200,000 and 100,000 oscillations per second, and the two alternators 405 and 409 are arranged to generate alternating current of the same frequencies respectively as the frequencies to which the open aerial circuits 400 and 401 are tuned.

For impressing periodic amplitude variations of the same frequency and either of the same phase or different in phase upon the high frequency oscillations set up in the two open circuits 400 and 401 by the alternators 405 and 409, the two coils 404 and 408 are arranged to surround respectively two corresponding sides of two soft iron rectangular cores 415 and 416, which are arranged to be magnetized respectively by two magnetizing circuits 417 and 418, which include respectively two coils 419 and 420, two batteries 421 and 422, and two rheostats or variable resistances 423 and 424, the coils 419 and 420 being arranged to surround two corresponding sides of the two cores 415 and 416. A third side of each of the cores 415 and 416 is surrounded by a coil 425, and these two coils 425 are respectively in two intermediate circuits 426 and 427 including respectively a variable inductance 428 and a secondary coil 429, and a variable condenser 430 and a secondary coil 431. Arranged between the secondary coils 429 and 431 is an auxiliary circuit 435 including two primary coils 436 and 437, and an alternator 440, which is arranged to set up alternating current having the same frequency as the frequency of the periodic amplitude variations which it is desired to impress upon the oscillations in the open aerial circuits 400 and 401, for instance, having a frequency of 20,000 alternations per second. The primary coils 436 and 437 are inductively coupled to the secondary coils 429 and 431 in such a manner that when oscillations are set up in the closed auxiliary circuit 435 by the alternator 440 corresponding oscillations will be inductively set up in the two intermediate circuits 426 and 427 and will act upon the two cores 415 and 416 to periodically vary the free magnetization of the two coils 415 and 416 and consequently to periodically vary the inductant effects of the two coils 404 and 408 and throw the open aerial circuits 400 and 401 into and out of tune at the frequency of the alternator 440 of the auxiliary circuit 435, thus periodically varying the amplitude of the electro-radiant oscillations emitted by the open circuits 400 and 401 at the same rate, for instance, of 20,000 per second.

For varying the phase relationship in the periodic amplitude variations of the two series of oscillations emitted by the open aerial circuits 400 and 401, a variable condenser 441 is in a circuit 442 shunted around the variable condenser 430 and controlled by a key or switch 443. These variable condensers 430 and 441 are preferably so adjusted that when the key 443 is closed and the system is in operation, a phase difference of approximately 90° will be produced between the two series of periodic amplitude variations of the emitted waves, and when the key 443 is open, this phase difference will be reduced to 0°, so that the two series of periodic amplitude variations will be in the same phase.

For adapting the system shown in Fig. 5 for use in transmitting telephone messages, a telephone transmitter or microphone 445 is arranged in a circuit 446 shunted around the key 443 and controlled by a switch 447. When it is desired to use the system for transmitting telegraphic messages, the switch 447 is left open and the key 443 is used for transmitting the messages, but when it is desired to use the system for transmitting telephone messages, the key 443 is left open and the switch 447 is kept closed.

The transmission system shown in Fig. 5 may be utilized in connection with a receiving system such as is shown in Fig. 4, or any other suitable receiving system, to transmit either telegraphic or telephonic messages, and when so used will cause the operation of a receiving device as a result of a difference in phase between the two series of periodic amplitude variations, as hereinbefore described.

In Fig. 6 is shown a modified form of transmission system constructed in accordance with this invention and arranged to emit three series of high frequency oscillations having three different frequencies respectively, and provided with means for impressing upon the three series of oscillations three series of periodic amplitude variations having the same frequency, and means for varying the phase relation between the three series of periodic amplitude variations.

This modified system shown in Fig. 6 comprises three open aerial circuits 460, 461 and 462, each of which comprises an antenna 465 grounded as at 466 through a coil 467 and a high frequency alternator 468. These three open circuits 460, 461 and 462 are tuned respectively to three different frequencies, for instance, to 200,000, 150,000 and 100,000 oscillations per second. The three alternators 468 are arranged to generate electrical alternations having the same frequencies respectively as the frequencies to which the open aerial circuits 460, 461 and 462 are tuned.

For impressing three series of periodic amplitude variations upon the three series of oscillations set up in the three open circuits 460, 461 and 462, the three coils 467 surround respectively three corresponding sides of three magnetic soft iron cores 470, which are arranged to be magnetized by three batteries 471 acting through three rheostats 472 and three coils 473 which surround respectively three corresponding sides of the three cores 470. For periodically varying the magnetization of the cores 470, a three-phase high frequency alternator 475 is arranged to deliver energy to a three-phase transformer 476 which includes three primary coils 477. These primary coils 477 are inductively coupled respectively to three secondary coils 478, which are respectively in three intermediate circuits 479, including respectively three coils 480 which surround corresponding sides of the cores 470 respectively. Two of these intermediate circuits 479 include respectively a variable inductance 481 and a variable condenser 482. The variable inductance 481 and the variable condenser 482 may be so adjusted that the three series of periodic amplitude variations set up in the three open circuits 460, 461 and 462 by the action of the three-phase alternator 475 will occur with a phase difference of, for instance 120° between each series of periodic amplitude variations and the succeeding series.

For controlling the open aerial circuits 460, 461 and 462 in Fig. 6 for either telegraphic or telephonic messages, means are provided including a commutator 485 provided with four stationary brushes 486, 487, 488 and 489. The commutator 485 is arranged to be rotated about a fixed axis at a uniform rate by any suitable means (not shown). The surface of this commutator is divided longitudinally into two spaced portions insulated from each other by a cylindrical strip 490 extending centrally around the commutator. The four brushes are arranged to engage the surface of the commutator along a line which is parallel with the axis of rotation of the commutator, and are arranged in pairs 486, 487 and 488, 489 to engage the two spaced portions of the commutator respectively. Cylindrical surfaces of the two spaced portions of the commutator are made up respectively of two aligned series of equal conducting segments separated by two aligned series of equal insulating segments. These segments are so arranged that as the commutator rotates each aligned pair of conducting segments are moved simultaneously into and simultaneously out of engagement with the pairs of brushes 486, 487 and 488, 489 respectively. One pair 486 and 487 of the brushes are connected respectively by conductors 491 and 492 to one side of the variable inductance 481 and to a key or switch 493, which is arranged to swing about a fixed axis and to be moved into and out of engagement with three aligned spaced contacts 494, 495 and 496 fixed in the path of the key. The key 493 comprises two conducting portions which are separated by an insulating portion 497, and the arrangement of the insulated portion is such that when the key 493 is closed upon the contacts 494, 495 and 496, the key will electrically connect the contact 494 with the conductor 492, and the contact 495 with the contact 496, but will not electrically connect the contact 494 with the contact 495. The other pair of brushes 488 and 489 are connected respectively by two conductors 498 and 499 to the fixed contact 496 and to one side of the variable condenser 482. The other sides of the variable inductance 481 and the variable condenser 482 are connected respectively by conductors 500 and 501 to the two fixed contacts 494 and 495.

In the operation of the transmission system shown in Fig. 6 for transmitting telegraphic messages, the commutator 485 is caused to rotate at such a rate as to cause the circuits controlled by the brushes 486 to 489 to be interrupted at a rate of, for instance, 1,000 interruptions per second, and the key 493 is used to send the telegraphic signal. As long as the key 493 is open, the variable inductance 481 and the variable condenser 482 will be included in their corresponding intermediate circuits 479 and will act upon these circuits to cause the three series of periodic amplitude variations to be impressed upon the open aerial circuits 460, 461 and 462 simultaneously and in the same phase, but when the key 493 is closed, the variable inductance 481 and the variable condenser 482 will be simultaneously and periodically short-circuited automatically at a rate controlled by the commutator 485, for instance, at a rate of 1,000 per second, and each time that these elements are short-circuited the phase relation between the three series of periodic amplitude variations will be modified in such a manner as to produce a difference in phase of 120° between the periodic amplitude variations of one series and the periodic amplitude variations of the second series, and also a phase difference of 120° between the periodic amplitude variations of the second series and the periodic amplitude variations of the third series.

In the operation of the transmission system shown in Fig. 6 for transmitting telephonic messages, the commutator 485 is caused to rotate at a frequency above audibility but lower than the secondary frequency of the system which is produced by high frequency alternator 475, and the two switches 493 and 514 are both kept closed. The telephone message may then be transmitted by speaking into the telephone transmitter 511.

In Fig. 7 is shown a receiving system constructed in accordance with this invention and arranged to receive either telegraphic or telephonic messages transmitted by the transmission system shown in Fig. 6, or by any other suitable transmission system. This receiving system includes three open aerial circuits 525 which are tuned respectively to the three different frequencies of the waves intended to be received, for instance, to 200,000, 150,000 and 100,000 oscillations per second. These three open circuits 525 are inductively coupled to three closed oscillatory circuits 526, which are correspondingly tuned to the same frequencies respectively as the open circuits. These closed circuits 526 are arranged in a well-known manner to control respectively three primary detectors 527 of any well-known or suitable form, the detectors shown being gaseous detectors of well-known form. These primary detectors 527 are arranged to control respectively three circuits 528 including respectively three primary coils 529 and three high potential batteries 530, or other suitable sources of electric energy. The three primary coils 529 are arranged respectively in three closed oscillatory circuits 531, including respectively three variable condensers 532. These circuits 531 are each tuned to the secondary frequency of the transmission system, for instance, to 20,000 oscillations per second. The three primary coils 529 are inductively coupled respectively to three secondary coils 535, which are respectively in three closed oscillatory circuits, 536, 537 and 538, which include respectively three variable condensers 539, and three primary coils 540, 541 and 542. These three closed circuits 536, 537 and 538 are each tuned to the secondary frequency of the system, for instance, to 20,000 oscillations per second. The primary coils 540, 541 and 542 are each divided into two spaced aligned sections and are so arranged that their longitudinal axes lie in the same plane and intersect at a common point about which these axes are equi-angularly spaced. Surrounded by the sections of the three primary coils 540, 541 and 542 are six secondary coils 545, which are arranged so that their longitudinal axes are in a plane with the longitudinal axes of the primary coils and radiate equi-angularly from the point of intersection of the longitudinal axes of the primary coils. The secondary coils 545 are also arranged so that the longitudinal axes of each pair of opposed coils coincides with a line which bisects the angle formed between the longitudinal axes of two corresponding primary coils. The secondary coils 545 are in a closed oscillatory circuit 546, which includes a variable condenser 547 and which is tuned to six times the secondary frequency of the system, which in the present instance will be to 20,000 oscillations per second. This closed circuit 546 is arranged to control a secondary gaseous detector 548 of well-known construction. This secondary detector 548 is arranged to control a circuit 549 including a high potential battery 550 and a primary coil 552. The primary coil 552 is in a closed circuit 553, which includes a variable condenser 554 and which is tuned to the third frequency of the system, the third frequency being determined by the commutator 485 of the transmission system shown in Fig. 6, and being, for instance, 1,000 oscillations per second. The primary coil 552 is inductively connected to a secondary coil 555 which is in a closed circuit 556, including a variable condenser 557, and which is tuned to the same frequency as the closed circuit 553. The closed circuit 556 is arranged to control an auxiliary detector 558, which in turn is arranged to control a circuit 559, including a high potential battery 560 and a telephone 561, or other suitable receiving device.

In the operation of the receiving system shown in Fig. 7, when three series of waves from the three transmitting systems shown in Fig. 6 are received by the three open circuits 525, three series of oscillations of a frequency of 20,000 per second will be set up respectively in the three closed circuits 536, 537 and 538 under the control of the three primary detectors 527. These three series of oscillations will have a phase difference substantially of 120°, which is varied to approximately zero periodically at a rate of 1,000 variations per second through the action of the commutator 485 of the transmission system shown in Fig. 6, and consequently these oscillations will act in the primary coils 540, 541 and 542 to set up a magnetic field around these coils which will alternately rotate at a rate of 20,000 revolutions per second, and remain stationary at the rate of 1,000 times per second, and the effect of this magnetic field upon the secondary coils 545 will be to set up an oscillating current of 20,000 oscillations per second in the closed oscillatory circuit 546 containing these secondary coils, and the amplitude of these oscillations will be varied periodically at the rate of 1,000 variations per second owing to the interruptions of 1,000 per second in the rotary movement of the magnetic field. These oscillations will act through the secondary detector 548 to set up current impulses of 120,000 per second, periodically varied in amplitude at the rate of 1,000 variations per second, in the circuit 549 controlled by the secondary detector. These impulses thus modified will set up oscillations of 1,000 per second in the closed circuit 553 which will act to set up corresponding oscillations in the closed circuit 556, which in turn will act through the auxiliary detector 558 to cause unidirectional impulses having a frequency of 1,000 per second to flow through the circuit 559 controlled by the auxiliary detector 558, and consequently an audible tone will be produced in the telephone receiver 561.

In Fig. 8 is shown an improved transmission system constructed in accordance with this invention, comprising four open aerial circuits 570, 571, 572 and 573, each of which includes an antenna 576 grounded as at 577 through a coil 578 and a high frequency alternator 579. These four open circuits 570 to 573 are tuned respectively to four different frequencies, for instance, to 200,000, 160,000, 120,000 and 100,000 oscillations per second, and the corresponding four alternators 579 are arranged to generate alternations of the same frequencies respectively as the frequencies to which the open circuits 570 to 573 are tuned.

For impressing periodic amplitude variations upon the four open circuits 570 to 573, four rectangular soft iron cores 580 are arranged to extend through the four coils 578 respectively. These cores are arranged to be magnetized to a suitable degree respectively by four batteries 581 acting respectively through four rheostats 582 and four magnetizing coils 583, which are wound around the respective cores. For impressing upon two of the open circuits 570 and 571 amplitude variations having one frequency, for instance, of 20,000 per second, and for impressing upon the other pair of open circuits 572 and 573 periodic amplitude variations having a different frequency of, for instance, 21,000 per second, two electric alternators 585 and 586 are provided, arranged to generate alternations of 20,000 per second and 21,000 per second respectively in two closed circuits 587 and 588, each of which contains two primary coils 589 and 590, and 591 and 592. The primary coils 589 and 590 are inductively connected to the secondary coils 593 and 594, which are respectively in two closed intermediate circuits 595 and 596, which contain respectively two coils 597 and 598, which surround corresponding portions of the two cores 580 of the two open circuits 570 and 571. These two closed intermediate circuits 595 and 596 also contain respectively a variable inductance 599 and a variable condenser 600. The two primary coils 591 and 592 are inductively connected to two secondary coils 605 and 606, which are in two intermediate closed circuits 607 and 608, which include respectively two coils 609 and 610 which surround respectively corresponding portions of the two cores 580 of the two open circuits 572 and 573. These two intermediate circuits 607 and 608 also contain respectively a variable condenser 611 and a variable inductance 612. For short-circuiting the two variable condensers 600 and 611, a switch 613 is arranged to swing into and out of engagement with four fixed contacts 614, two of which are connected respectively by two conductors 615 to the opposite sides of one of the variable condensers 600, and the other two of which are connected respectively by a conductor 616 to the opposite sides of the other variable condenser 611. When the key 613 is closed, the two variable condensers 600 and 611 will be short-circuited. When the key 613 is open, the two condensers 600 and 611 will shift the phase of the two intermediate circuits 596 and 607.

In the operation of the transmission system shown in Fig. 8, the two variable condensers 600 and 611 are so adjusted that when the alternators 579, 585 and 586 are in operation and the key 613 is open, four series of continuous oscillations having wave frequencies of 200,000, 160,000, 120,000 and 100,000 respectively will be emitted by the four open circuits 570 to 573, and upon the two series of oscillations emitted by the two open circuits 570 and 571 will be impressed respectively two series of periodic amplitude variations having the same frequency of 20,000 per second and differing in phase by 90°, while upon the two series of waves emitted by the two other open circuits 572 and 573 will be impressed respectively two series of periodic amplitude variations having the same frequency of 21,000 per second but differing in phase by 90°. Now if the key 613 should be closed, the two variable condensers 600 and 611 will be short-circuited and the four open circuits 570 to 573 will continue to emit four series of waves periodically varied in amplitude, as just described, but with substantially no difference in phase between the two series of periodic amplitude variations impressed upon the waves emitted by the four open circuits 570 to 573, or by the two open circuits 572 and 573.

To adapt the transmission system shown in Fig. 8 to be used for sending either telegraphic or telephonic messages, a double telephone transmitter 617 is provided, which is of well-known construction, including a mouthpiece 618 and two microphones 619 controlled by the mouthpiece 618. These two microphones 619 are connected through two pairs of conductors 620 and 621 to the two pairs of conductors 615 and 616 respectively, and the telephone transmitter 617 is provided with a switch 622 whereby the transmitter may be thrown into or out of operation. When it is desired to use the system for transmitting telephone messages, the speed of one of the alternators 586 is increased to, for instance, 30,000 alternations per second so as to produce a difference of 10,000 or more alternations per second between the two secondary frequencies of the system. The key 613 is now opened and the switch 622 is closed to throw the telephone transmitter 617 into operation. The variable condensers 600 and 601 are then adjusted so that when no sound waves are being directed into the mouthpiece 618, there will be a phase difference of substantially 90° between the two series of amplitude variations impressed upon each pair of series of emitted oscillations. Now when the operator speaks into the mouthpiece 618, the resistances of the two short circuits around the two variable condensers 600 and 601 will be simultaneously varied in accordance with the sound waves received by the mouthpiece 618, and in consequence the phase difference of 90° between each pair of series of amplitude variations will be accordingly modified and will affect the receiving system accordingly, as will appear hereinafter.

In Fig. 9 is shown a receiving system constructed in accordance with this invention and arranged to receive four series of waves transmitted by a suitable transmission system, as for instance, the transmission system shown in Fig. 8, and hereinbefore described. This receiving system shown in Fig. 9 comprises four open aerial circuits 625, 626, 627 and 628, which are tuned respectively to the four different high frequencies of the received waves, for instance, to 200,000, 160,000, 120,000 and 100,000 oscillations per second. The four open aerial circuits 625 to 628 are inductively connected respectively to four closed oscillatory circuits 630, which are tuned respectively to the same frequencies as the frequencies of the open circuits 625 to 628. These four closed circuits 630 are arranged to control four primary detectors 631, of any suitable construction, but which in the form shown are gaseous detectors of well-known construction. These four detectors 631 control respectively four closed circuits 632, 633, 634 and 635, which include respectively four high potential batteries 636 and four primary coils 637, 638, 639 and 640. These primary coils 637 to 640 are arranged so that their longitudinal axes are equi-angularly arranged around a point, and so that the longitudinal axes of the two coils 637 and 638, controlled by the pair of open circuits 625 and 626, will intersect at right angles, and so that the other pair of primary coils 639 and 640, controlled by the other pair of open circuits 627 and 628, will also intersect at right angles. Each of these primary coils is formed in two spaced aligned sections, thus allowing the insertion of a group of secondary coils 650 into the fields of these primary coils. These primary coils 637 to 640 are arranged respectively in four oscillatory circuits 641, 642, 643 and 644, which include respectively four variable condensers 645, 646, 647 and 648. The two closed circuits 641 and 642, containing respectively the two primary coils 637 and 638, are each tuned to the same one of the two secondary frequencies of the received waves, for instance, to 20,000 oscillations per second while the closed circuits 643 and 644, containing the primary coils 639 and 640, are each tuned to the other secondary frequency of the received waves, for instance, to 21,000 oscillations per second. Surrounded by the eight sections of the four primary coils 637 to 640 are a number, say eight, of secondary coils 650, which are arranged so that their longitudinal axes lie in a plane with the longitudinal axes of the primary coils 637 to 640, and radiate from and are equi-angularly disposed around the point of intersection of the longitudinal axes of the primary coils. These secondary coils 650 are arranged in series in a closed oscillatory circuit 651, which includes a variable condenser 652. This closed circuit 651 is tuned to the difference of the two secondary frequencies of the system. Therefore, in the present case this closed circuit 651 would be tuned to 21,000 minus 20,000, or in other words, would be tuned to 1,000 oscillations per second. This closed circuit 651 is arranged to control a secondary detector 653 of any suitable construction, and which in the form shown is a gaseous detector of well-known construction. The secondary detector 653 is arranged to control a circuit 654, which includes a primary coil 655 and a high potential battery 656, or other suitable source of electric energy. The coil 655 is in a closed oscillatory circuit 656', which includes a variable condenser 657, and which is tuned to the difference between the two secondary frequencies of the received waves, which in the present case would be to the difference between 20,000 and 21,000, or in other words, to a frequency of 1,000 oscillations per second. The primary coil 655 is inductively connected to a secondary coil 658, which is in a closed oscillatory circuit 659, including a variable condenser 660 and which is tuned to the same frequency as the controlling closed circuit 656', or in other words, to 1,000 oscillations per second. The closed circuit 659 controls an auxiliary detector 661, which may be of the same construction as the other detectors of the system, and which is arranged to control a circuit 662, which includes a battery 663 and a telephone receiver 664, or other suitable receiving instrument.

In the operation of the receiving system shown in Fig. 9, when four series of waves of the proper frequencies and suitably varied periodically in amplitude, as hereinbefore described, are received upon the four open circuits 625 to 628, the four primary detectors 631 will be operated and oscillations having a frequency of 20,000 per second will be set up in the two closed oscillatory circuits 641 and 642, which include the two primary coils 637 and 638, which are arranged at right angles to each other, and oscillations having a frequency of 21,000 per second will be set up in the two closed oscillatory circuits 643 and 644, which include the two primary coils 639 and 640, which are arranged at right angles to each other. The oscillations of 20,000 per second in the two primary coils 637 and 638 will cause a magnetic field to be set up in the space surrounded by these coils, and this magnetic field will be caused to rotate uniformly at a rate of 20,000 revolutions per second whenever the key 613 of the transmission system (see Fig. 8) is open, and the two series of oscillations in the two primary coils 637 and 638 of the receiving system consequently have a phase difference of 90°. The oscillations of 21,000 per second set up in the two primary coils 639 and 640 will cause a magnetic field to be set up in the space surrounded by these coils, which will be constant in intensity and which will rotate uniformly at a rate of 21,000 revolutions per second whenever the key 613 of the transmitting system is open, owing to the consequent phase difference of 90° in these oscillations. By the proper choice of the leads to the coils 637, 638, 639, 640, the rotation of the two magnetic fields may be made to occur either in the same direction or in opposite directions respectively, as is well known. These two magnetic fields rotating at slightly different rates in the same direction will induce in a secondary, two currents of 21,000 cycles and 20,000 cycles respectively. These two currents will beat with one another producing the frequency of 1,000 variations per second. These periodically varied oscillations will act through the secondary detector 653 to set up in the closed circuit 656' oscillations having a frequency of 1,000 per second, which will act upon the succeeding closed circuit 659 to set up oscillations therein having a frequency of 1,000 oscillations per second, which will act through the final detector 661 to cause unidirectional current impulses having a frequency of 1,000 per second to flow through the controlled circuit 662, and thus cause the telephone 664 to emit an audible tone. When the switch 613 of the transmitting system is closed, the difference in phase of 90° between each pair of series of transmitted waves will be reduced to substantially zero, and when received upon the receiving system shown in Fig. 9 will not cause any rotating magnetic field and consequently will have no appreciable effect upon the telephone 664, or other receiving instrument.

When the receiving system shown in Fig. 9 is used to receive telephone messages from the transmission system shown in Fig. 8, the closed circuits 643 and 644 should be tuned to the modified frequency of the alternator 586 of the transmission system, for instance, to 30,000 oscillations per second, and the circuit 651 should be tuned to 10,000 oscillations per second instead of 1,000, while the circuits 656 and 659 should be tuned to 10,000 oscillations per second each, instead of 1,000 per second as when used for telegraphy. Now when telephone messages are received from the transmission system shown in Fig. 8, by the receiving system shown in Fig. 9, oscillations of 20,000 per second will be set up in the two closed circuits 641 and 642, containing the two primary coils 637 and 638, and oscillations of 30,000 per second will be set up in the two closed circuits 643 and 644, containing the two primary coils 639 and 640. The two series of oscillations of 20,000 per second will have a phase difference of 90°, and the two series of oscillations of 30,000 per second will also have a phase difference of 90° when the telephone transmitter 617 is not acted upon by sound waves; but when the telephone transmitter 617 is acted upon by sound waves, this phase difference between the two pairs of series of oscillations and the two pairs of circuits 641 and 642, 643 and 644, will be modified in accordance with the sound waves received by the transmitter 617. The result will be that the two primary coils 637 and 638 will set up a magnetic field which will rotate at a uniform rate of 20,000 rotations per second, while the two primary coils 639 and 640 will set up a magnetic field which will rotate at the rate of 30,000 rotations per second. The effect of these two magnetic fields rotating in the same direction at rates of 20,000 and 30,000 per second respectively will be to induce in the secondary winding currents of the same frequency as the rotating magnetic fields, which will beat with one another at a rate equal to the difference in the two frequencies, which in the present case would be at the rate of 10,000 variations per second. Moreover, upon the magnetic fields would be impressed variations in strength corresponding to the sound waves received by the transmitter 617, and these variations in strength would set up corresponding variations in amplitude in the oscillations set up in the secondary coils 650, and consequently in the closed oscillatory circuit 651, in which oscillations of 10,000 per second would be produced. The oscillations of 10,000 per second in the closed circuit 651 would have impressed thereon variations in amplitude corresponding to the sound waves acting upon the transmitter 617. The oscillations in this closed circuit 651 would act through the secondary detectors 653 to set up oscillations of 10,000 per second, having amplitude variations corresponding to sound waves impressed thereon. These oscillations of 10,000 per second, thus modified, would produce corresponding oscillations in the closed circuit 659, which would act upon the final detector 661 to cause unidirectional current impulses to flow through the controlled circuit 662 having a frequency of 10,000 impulses per second, and having impressed thereon amplitude variations corresponding to the sound waves received by the transmitter 617. These high frequency impulses of 10,000 per second would be practically inaudible in the telephone receiver 664, but the amplitude variations of these high frequency impulses would act upon the telephone receiver 664 and would cause the telephone receiver 664 to reproduce the sounds received by the transmitter 617.

In Fig. 10 is shown a receiving system constructed in accordance with this invention and arranged to be utilized in connection with any well-known suitable transmission system arranged to emit simultaneously two series of waves having two different high frequencies. This receiving system includes two open aerial circuits 675 and 676, which may be tuned respectively to any desired two different high frequencies, for instance, to 200,000 per second and 150,000 per second. These two open circuits 675 and 676 are inductively connected respectively to two closed oscillatory circuits 677 and 678, which are tuned to the frequencies of the open circuits respectively, and which are arranged to control two primary detectors 679 and 680, of any well-known or suitable construction, but which in the form shown are gaseous detectors of well-known construction. These two primary detectors 679 and 680, are arranged to control respectively two circuits 681 and 682, which include respectively two batteries 683 and 684, two primary coils 685 and 686, and two auxiliary coils 687 and 688. The two primary coils 685 and 686 are arranged in two closed oscillatory circuits 690 and 691, which include respectively the auxiliary coil 687 and a variable condenser 692 and the auxiliary coil 688, and a variable condenser 693. These two closed circuits 690 and 691 are tuned respectively to the frequencies corresponding to the open circuits 675 and 676, for instance, to 200,000 and 150,000 oscillations per second. The two primary coils 685 and 686 are arranged so that their longitudinal axes intersect. The two auxiliary coils 687 and 688 are inductively connected to two auxiliary coils 695 and 696, which are arranged respectively in two auxiliary closed circuits 697 and 698. These two circuits 697 and 698 are so adjusted with respect to the auxiliary coils 687 and 688 that there will be a difference in phase of 90° between the oscillations set up in the closed circuit 690 and the oscillations consequently induced in the closed circuit 697, and also a difference of 90° in phase between the oscillations set up in the closed circuit 698. These two circuits 697 and 698 include respectively two primary coils 699 and 700, which are arranged so that their longitudinal axes lie in a plane with the longitudinal axes of the primary coils 685 and 686, and intersect at the point of intersection of the longitudinal axes of the coils 685 and 686, the arrangement being such that the longitudinal axis of the primary coil 699 will be perpendicular to the longitudinal axis of the primary coil 685, and the longitudinal axis of the primary coil 700 will be perpendicular to the longitudinal axis of the primary coil 686. Each of these primary coils 685, 686, 699 and 700 is arranged in the form of two spaced aligned sections. Surrounded by the sections of the primary coils 685, 686, 699 and 700 are six secondary coils 710, which are arranged so that their longitudinal axes lie in a plane with the longitudinal axes of the primary coils 685 and 686, and intersect at the point of intersection of the longitudinal axes of the primary coils 685 and 686. The secondary coils 710 are arranged equiangularly around the point of intersection of their axes, so that their longitudinal axes bisect respectively the angles between the longitudinal axes of successive sections of the primary coils 685 and 686, 699 and 700. These secondary coils 710 are in a closed circuit 711, which includes a variable condenser 712, and which is tuned to the differences of the two high frequencies to which the open circuits 675 and 676 are tuned. In other words, the closed circuit 711 is tuned in the present instance to 50,000 oscillations per second. This closed circuit 711 is arranged to control a secondary detector 715, which is arranged to control a circuit 716, which includes a battery 717 and a primary coil 718. The primary coil 718 is in a closed oscillatory circuit 719, which includes a variable condenser 720, and which is tuned to the difference between the two high frequencies of the open aerial circuits, 675 and 676, which in the present case would be 50,000 oscillations per second. This closed circuit 719 is inductively connected to a closed oscillatory circuit 725, which is also tuned to 50,000 oscillations per second, and which is arranged to control through an interrupter 730, or other suitable means for rendering the pulsations in the circuit 727 audible in the telephone receiver 729 when the system is used for receiving telegraphic messages, an auxiliary detector 726 of any suitable construction, which is arranged to control a circuit 727, which includes a battery 728 and a telephone receiver 729, or other suitable receiving instrument. A switch 731 is arranged to control a shunt circuit 732 extending around the interrupter 730, and this switch 731 may be used to render the interrupter 730 either effective or non-effective, to control the circuit 727.

When it is desired to use the system for receiving telephone messages, the switch 731 is kept closed, thus short-circuiting the interrupter 730, and in this case unidirectional current impulses of 50,000 per second will be set up in the circuit 727, containing the telephone receiver 729, and these impulses will be varied in amplitude, as hereinbefore described in connection with the receiving system shown in Fig. 7, in accordance with the sound waves acting upon the telephone transmitter of the transmitting system.

In the operation of the system shown in Fig. 10 for receiving telegraphic messages, when two series of high frequency waves having a prescribed frequency of 200,000 and 150,000 per second are received by the open circuits 675 and 676, the primary detectors 679 and 680 will be caused to operate to set up oscillations having frequencies respectively of 200,000 and 150,000 per second in the two closed circuits 690 and 691. These oscillations of 200,000 per second in the closed circuit 690 will act through the auxiliary coil 687 to set up corresponding oscillations of 200,000 per second in the closed circuit 697. These two series of oscillations, differing 90° in phase, will act through the primary coils 685 and 699, respectively, to set up a magnetic field of constant strength, which will rotate at a uniform rate of 200,000 rotations per second. The oscillations of 150,000 per second set up in the closed circuit 691 will act through the auxiliary coil 688 to set up corresponding oscillations of 150,000 per second in the closed circuit 698, these two series of oscillations having a phase difference of 90° and acting through the primary coils 686 and 700 to set up rotating magnetic fields. The effect of these two magnetic fields rotating in the same direction and at different rates will be to induce in the secondary, currents of the same frequency as the rotating magnetic fields. These currents will beat with one another producing 50,000 variations per second, each acting upon the secondary coil 710 will set up in the closed circuit 711 oscillations having impressed thereon periodic amplitude variations having a frequency of 50,000 per second. These oscillations, thus modified, will act through the secondary detector 715 to set up corresponding unidirectional current impulses in the controlled circuit 716 through the battery 717 and coil 718, and these unidirectional current impulses will cause oscillations having a frequency of 50,000 per second to be set up in the closed oscillatory circuit 719, and these oscillations will cause corresponding oscillations to be set up in the closed circuit 725, which will act through the auxiliary detector 726 to cause corresponding unidirectional current impulses of 50,000 per second frequency to be set up in the circuit 727, containing the telephone receiver 729.

When telegraphic signals are being received, the switch 731 will be left open, and the interrupter 730 will be operated at such a rate as to interrupt the circuit through the telephone receiver 729 at the rate of 1,000 interruptions per second, or any suitable rate to render current impulses audible in the telephone receiver 729.

In Fig. 11 is shown another modified form of receiving system constructed in accordance with this invention. This system is arranged to receive a continuous series of electro-radiant oscillations of a given high frequency upon which is imposed a series of periodic amplitude variations having a given frequency less than the high frequency of the oscillations. For instance, this receiving system may be arranged to receive a series of oscillations having a wave frequency of 200,000 oscillations or cyles per second and having imposed thereon a periodic amplitude variation of 10,000 variations or cycles per second. This system includes an open aerial circuit 750, which is tuned, for instance, to 200,000 oscillations per second. This circuit 750 is inductively connected to an oscillatory circuit 751 which is tuned to the same frequency as the open circuit 750 and which is arranged to control a primary detector 752 of any well-known or suitable construction. The primary detector 752 is arranged to control a closed circuit 753, which includes a battery 754, a primary coil 755 and an auxiliary coil 756. These two coils 755 and 756 are in a closed oscillatory circuit 757 including a variable condenser 758 and which is tuned to the secondary frequency of the received waves, for instance, to 10,000 oscillations per second. The auxiliary coil 756 is arranged to act inductively upon a secondary coil 760, which is in a closed circuit 761, which includes a primary coil 762. The coils 756 and 760 of the two closed circuits 757 and 761 are so adjusted that there will be a phase difference of substantially 90 degrees between the oscillations produced in the closed circuit 761 and the oscillations set up in the closed circuit 757. The two primary coils 755 and 762 are each arranged in two alined spaced sections so that the longitudinal axes of the two primary coils will intersect at right angles. Arranged between the sections of the two primary coils 755 and 762 is a straight secondary coil 765 which is rigidly secured to but insulated from a shaft 766, the longitudinal axis of which contains the point of intersection of the two axes of the two primary coils 755 and 762 and is perpendicular to the plane of these two axes, the secondary coil 765 being so arranged that its longitudinal axis is perpendicular to and intersects the longitudinal axis of the shaft 766 at the point of intersection of the longitudinal axis of the shaft 766 with the longitudinal axes of the two primary coils 755 and 762. The shaft 766 is arranged to be rotated about a fixed axis coincident with its longitudinal axis at a constant rate, for instance, at the rate of 600 revolutions per second, by means of a motor 767 or any other suitable means. Surrounding the shaft 766 but insulated therefrom and from each other are two conducting rings 768 and 769 which are respectively connected electrically to the oposite ends of the secondary coil 765 by means of two conductors 770 and 771. Arranged in engagement with the two conducting rings 768 and 769 are two stationary brushes 772 and 773 which are arranged in a closed oscillatory circuit 775 containing a variable condenser 776 and which is tuned to a frequency equal to the secondary frequency of the system, plus or minus the rate of rotation of the shaft 766, the rate of rotation of the shaft 766 being added to the secondary frequency when the direction of rotation of the shaft 766 is opposite to that of the magnetic field produced, as will appear hereinafter, by the primary coils 755 and 762, and the rate of rotation of the shaft 766 being subtracted from the secondary frequency of the system when the direction of rotation of the shaft 766 is the same as that of the magnetic field. In other words, when the shaft 766 is rotated in an opposite direction to that of the magnetic field, the closed circuit 775 will be tuned to a frequency of 10,000 plus 600, and when the shaft is rotated in the same direction as the magnetic field the closed circuit 775 will be tuned to a frequency of 10,000 minus 600. The closed circuit 775 controls through an interrupter 777, a secondary detector 780 of any well-known or suitable construction. A circuit 781 is shunted around the interrupter 777 and is controlled by a switch 783 to render the interrupter either effective or ineffective. The interrupter 777 is arranged to be rotated at any suitable frequency, to interrupt the circuit at, for instance, 1,000 interruptions per second. The secondary detector 780 is arranged to control a circuit 783 containing a battery 784 and a telephone receiver 785 or other suitable receiving instrument.

In the operation of the system shown in Fig. 11, when a series of electroradiant waves having a frequency of 200,000 oscillations per second, and which are periodically varied in amplitude at the rate of 10,000 variations per second, are received by the open circuit 750, corresponding oscillations of 200,000 per second periodically varied in amplitude at the rate of 10,000 variations per second will be set up in the closed circuit 751, and these oscillations will act through the detector 752 to set up corresponding unidirectional impulses in the controlled circuit 753, which will cause oscillations of 10,000 per second to be set up in the closed circuit 757 which includes the primary coil 755 and the condenser 758. These oscillations of 10,000 per second will act through the coil 756 inductively upon the coil 760 and cause corresponding oscillations of 10,000 per second in the circuit 761 containing the primary coil 762, and these oscillations in the circuit 761 will differ in phase by 90 degrees from the oscillations set up in the circuit 757. These two series of oscillations of 10,000 per second and having a phase difference of 90 degrees, will act through the two primary coils 755 and 762 respectively to cause a rotating magnetic field of uniform strength to be set up in the space surrounded by the coils 755 and 762, and this field will rotate at a frequency of 10,000 rotations per second. The secondary coil 765 when rotated at 600 revolutions per second will be acted upon by the rotating magnetic field to set up oscillations in the closed oscillatory circuit 775 having a frequency of 10,000 plus or minus 600 oscillations per second depending upon the direction of rotation of the secondary coil 765, as hereinbefore described, and these oscillations will be interrupted by the interrupter 377 at a rate of 1,000 interruptions per second, and will act through the secondary detector 780 to set up corresponding unidirectional pulsations in the controlled circuit 781, which will be interrupted at the rate of 1,000 interruptions per second as the result of the action of the interrupter 777. These pulsations thus interrupted will act upon the telephone receiver 785 to produce an audible tone.

When the system shown in Fig. 11 is used for receiving telephonic messages transmitted from a distant station and impressed upon the received waves having a suitable high frequency and a suitable secondary frequency, the switch 782 is kept closed to render the interrupter 777 ineffective, and the variations in the rotating magnetic field produced by the primary coils 755 and 762 by the received telephone messages, and modified by the rotating coil 765, will act through the secondary detector 780 to cause the telephone receiver 785 to reproduce the sounds transmitted from the distant transmission station.

Although only a few of the many forms in which this invention may be embodied have been described herein, it is to be understood that the invention is not limited to any specific construction, but might be embodied in various forms without departing from the spirit of the invention or the scope of the appended claims.

Having thus fully described this invention, I claim

1. The method of signaling by radiant energy which consists in transmitting a plurality of series of waves in such a manner as to maintain a predetermined phase relationship among a plurality of said series, and then modifying said phase relationship and causing the functioning of a receiving device as a result of the modification of said phase relationship.

2. The method of signaling by radiant energy which consists in simultaneously transmitting a plurality of series of waves in such a manner as to maintain a predetermined phase relationship among a plurality of said series, and then modifying said phase relationship and causing the functioning of a receiving device as a result of the modification of said phase relationship.

3. The method of signaling by radiant energy which consists in generating a plurality of series of radiant waves, impressing upon a plurality of said series respectively a plurality of series of periodic variations having a predetermined phase relationship among said plurality of series of variations, then modifying said phase relationship, and causing the functioning of a receiving device as a result of the modification of said phase relationship.

4. The method of signaling by radiant energy which consists in generating a plurality of series of radiant waves, impressing upon a plurality of said series respectively a plurality of series of periodic amplitude variations having a predetermined phase relationship among said plurality of series of variations, then modifying said phase relationship, and causing the functioning of a receiving device as a result of the modification of said phase relationship.

5. The method of signaling by radiant energy which consists in generating a plurality of series of radiant waves, impressing upon a plurality of said series respectively a plurality of series of periodic variations having a predetermined phase relationship among said plurality of series of variations, selectively receiving said waves and variations in such a manner as to produce a rotating magnetic field and modifying said phase relationship to cause a variation in said field.

6. The method of signaling by radiant energy which consists in generating a plurality of series of radiant waves, impressing upon a plurality of said series respectively a plurality of series of periodic amplitude variations having a predetermined phase relationship among said plurality of series of variations, selectively receiving said waves and variations in such a manner as to produce a rotating magnetic field and modifying said phase relationship to cause a variation in said field.

7. The method of signaling by radiant energy which consists in generating a plurality of series of radiant waves, impressing upon a plurality of said series respectively a plurality of series of periodic variations having a predetermined phase relationship among said plurality of series of variations, selectively receiving said waves and variations in such a manner as to produce a rotating magnetic field, causing the production of oscillations in a closed circuit as a result of the action of said magnetic field, and modifying said phase relationship to cause a modification of said field and said oscillations in said circuit.

8. The method of signaling by radiant energy which consists in generating a plurality of series of radiant waves, impressing upon a plurality of said series respectively a plurality of series of periodic amplitude variations having a predetermined phase relationship among said plurality of series of variations, selectively receiving said waves and variations in such a manner as to produce a rotating magnetic field, causing the production of oscillations in a closed circuit as a result of the action of said magnetic field, and modifying said phase relationship to cause a modification of said field and said oscillations in said circuit.

9. The method of signaling by radiant energy which consists in generating a plurality of series of radiant waves, impressing upon a plurality of said series respectively a plurality of series of periodic variations having a predetermined phase relationship among said plurality of series of variations, selectively receiving said waves and variations in such a manner as to produce a rotating magnetic field, causing the production of oscillations having a predetermined frequency in a closed oscillatory circuit as a result of the action of said magnetic field, and periodically varying said phase relationship to produce corresponding periodic variations in said field, and consequently oscillations in said closed circuit.

10. The method of signaling by radiant energy which consists in generating a plurality of series of radiant waves, impressing upon a plurality of said series respectively a plurality of series of periodic amplitude variations having a predetermined phase relationship among said plurality of series of variations, selectively receiving said waves and variations in such a manner as to produce a rotating magnetic field, causing the production of oscillations having a predetermined frequency in a closed oscillatory circuit as a result of the action of said magnetic field, and periodically varying said phase relationship to produce corresponding periodic variations in said field, and consequently oscillations in said closed circuit.

11. The method of signaling by radiant energy which consists in generating a plurality of series of radiant waves, impressing upon a plurality of said series respectively a plurality of series of periodic variations having a predetermined phase relationship among said plurality of series of variations, selectively receiving said waves and variations in such a manner as to produce a rotating magnetic field, causing the production of oscillations having a predetermined frequency in a closed oscillatory circuit as a result of the action of said magnetic field, and periodically varying said phase relationship to produce corresponding periodic amplitude variations in said field, and consequently oscillations in said closed circuit.

12. The method of signaling by radiant energy which consists in generating a plurality of series of radiant waves, impressing upon a plurality of said series respectively a plurality of series of periodic amplitude variations having a predetermined phase relationship among said plurality of series of variations, selectively receiving said waves and variations in such a manner as to produce a rotating magnetic field, causing the production of oscillations having a predetermined frequency in a closed oscillatory circuit as a result of the action of said magnetic field, and periodically varying said phase relationship to produce corresponding periodic amplitude variations in said field, and consequently oscillations in said closed circuit.

13. The method of signaling by radiant energy which consists in generating a plurality of series of radiant waves, impressing upon a plurality of said series respectively a plurality of series of periodic variations having a predetermined phase relationship among said plurality of series of variations, selectively receiving said waves and variations in such a manner as to produce a rotating magnetic field, causing the production of oscillations having a predetermined frequency in a closed oscillatory circuit as a result of the action of said magnetic field, causing variations in said phase relationship as a result of the action, and in accordance with, sound waves, and thereby causing corresponding variations in said field and corresponding variations in amplitude in the oscillations of said closed circuit.

14. The method of signaling by radiant energy which consists in generating a plurality of series of radiant waves, impressing upon a plurality of said series respectively a plurality of series of periodic amplitude variations having a predetermined phase relationship among said plurality of series of variations, selectively receiving said waves and variations in such a manner as to produce a rotating magnetic field, causing the production of oscillations having a predetermined frequency in a closed oscillatory circuit as a result of the action of said magnetic field, causing variations in said phase relationship as a result of the action, and in accordance with, sound waves, and thereby causing corresponding variations in said field and corresponding variations in amplitude in the oscillations of said closed circuit.

15. The method of signaling by radiant energy which consists in simultaneously transmitting a plurality of series of radiant waves, impressing upon said plurality of series of waves respectively a plurality of series of periodic variations normally maintaining a predetermined phase relationship among said plurality of series of variations, selectively receiving said waves and variations in such a manner as to produce a rotating magnetic field, causing the production of a continuous series of electric oscillations in a closed circuit as a result of the rotation of said field, periodically modifying said field, and thereby periodically modifying the amplitude of said oscillations in said closed circuit at a predetermined rate, causing the production of continuous electric oscillations in a closed circuit as a result of, and having the frequency of, said periodic variations in said first mentioned circuit, and causing the operation of a receiving device as a result of said oscillations in said second mentioned circuit.

16. The method of signaling by radiant energy which consists in generating radiant waves, impressing upon said waves a plurality of series of variations having a predetermined phase relationship among said plurality of series of variations, selectively receiving said waves and variations in such a manner as to produce a rotating magnetic field, causing the production of oscillations having a predetermined frequency as a result of the action of said magnetic field, said frequency being the frequency of one of said series of periodic variations.

17. The method of signaling by radiant energy which consists in generating radiant waves, impressing upon said waves a plurality of series of amplitude variations having a predetermined phase relationship among said plurality of series of variations, selectively receiving said waves and variations in such a manner as to produce a rotating magnetic field, causing the production of oscillations having a predetermined frequency as a result of the action of said magnetic field, said frequency being the frequency of one of said series of periodic variations.

18. The method of signaling by radiant energy which consists in generating radiant waves, impressing upon said waves a plurality of series of variations having a predetermined phase relationship among said plurality of series of variations, selectively receiving said waves and variations in such a manner as to produce a rotating magnetic field, causing the production of oscillations having a predetermined frequency as a result of the action of said magnetic field, said frequency being the frequency of one of said series of periodic variations, and causing the operation of a receiving device as a result of said oscillations.

19. The method of signaling by radiant energy which consists in generating radiant waves, impressing upon said waves a plurality of series of amplitude variations having a predetermined phase relationship among said plurality of series of variations, selectively receiving said waves and variations in such a manner as to produce a rotating magnetic field, causing the production of oscillations having a predetermined frequency as a result of the action of said magnetic field, said frequency being the frequency of one of said series of periodic variations, and causing the operation of a receiving device as a result of said oscillations.

20. The method of signaling by radiant energy which consists in generating radiant waves, impressing upon said waves a plurality of series of variations having a predetermined phase relationship among said plurality of series of variations, selectively receiving said waves and variations in such a manner as to produce a rotating magnetic field, causing the production of oscillations having a predetermined frequency as a result of the action of said magnetic field, said frequency being the frequency of one of said series of periodic variations, producing electric oscillations in an electrical circuit as a result of the action of said magnetic field, and causing the operation of a receiving device as a result of the actions of said oscillations.

21. The method of receiving energy which consists in causing the production of a rotating magnetic field as a result of the received energy, causing electrical oscillations in an electrical circuit as a result of the action of said field, causing unidirectional electrical pulsations in an electrical circuit as a result of said oscillations, and causing the operation of a receiving device as a result of said pulsations.

22. The method of signaling by electrical energy which consists in producing electrical oscillations having a comparatively high frequency, impressing upon said oscillations a plurality of series of periodic variations having a predetermined phase difference among said plurality of series of variations, receiving said waves and said variations, producing a rotating magnetic field as a result of the phase difference in said variations, and operating a receiving device as a result of the action of said magnetic field.

23. The method of signaling by electrical energy which consists in producing electrical oscillations having a comparatively high frequency, impressing upon said oscillations a plurality of series of periodic amplitude variations having a predetermined phase difference among said plurality of series of variations, receiving said waves and said variations, producing a rotating magnetic field as a result of the phase difference in said variations, and operating a receiving device as a result of the action of said magnetic field.

24. The method of transmitting and receiving radiant energy which consists in transmitting a plurality of series of periodic impulses in such a manner as to maintain a predetermined phase relationship among a plurality of said series, and then modifying said phase relationship and causing the functioning of said receiving device as the result of the modification of said phase relationship, the said plurality of series of impulses having the same frequency.

25. The method of transmitting and receiving radiant energy which consists in transmitting a plurality of series of periodic impulses in such a manner as to maintain a predetermined phase relationship among a plurality of said series, and then modifying said phase relationship and causing the functioning of said receiving device as the result of the modification of said phase relationship, the said plurality of series of impulses having the same and substantially constant frequency.

26. The method of transmitting and receiving radiant energy which consists in generating a plurality of series of radiant impulses, impressing upon a plurality of said series respectively a plurality of series of periodic variations having the same frequency and having a predetermined phase relationship among said plurality of series of variations, then modifying said phase relationship to produce a second predetermined phase relationship among said plurality of series of variations, and causing the functioning of a receiving device as the result of said modification of said phase relationship.

27. A receiving system for radiant energy comprising a plurality of receiving circuits tuned to the same frequency and including a plurality of stationary coils, said coils being arranged to produce a rotating magnetic field as the result of the energization of said circuit, and a circuit arranged within said field and arranged to be energized thereby, said last-mentioned circuit being tuned to a frequency greater than said first-mentioned frequency and having a definite relation to the number of said coils.

28. The method of receiving radiant energy which consists in causing the production of a rotating magnetic field as a result of the action of the received energy and causing the production of oscillations as the result of the action of said rotating field, rectifying said oscillations and causing said rectified oscillations to control the receiving device.

29. The method of signaling which consists in transmitting a plurality of series of waves in such a manner as to maintain a predetermined phase relationship among a plurality of said series, and then modifying said phase relationship and causing the functioning of a receiving device as a result of the modification of said phase relationship.

30. The method of signaling which consists in simultaneously transmitting a plurality of series of waves in such a manner as to maintain a predetermined phase relationship among a plurality of said series, and then modifying said phase relationship and causing the functioning of a receiving device as a result of the modification of said phase relationship.

31. The method of signaling which consists in generating a plurality of series of electric waves, impressing upon a plurality of said series respectively a plurality of series of periodic variations having a predetermined phase relationship among said plurality of series of variations, then modifying said phase relationship, and causing the functioning of a receiving device as a result of the modification of said phase relationship.

32. The method of signaling which consists in generating a plurality of series of electric waves, impressing upon a plurality of said series respectively a plurality of series of periodic amplitude variations having a predetermined phase relationship among said plurality of series of variations, then modifying said phase relationship, and causing the functioning of a receiving device as a result of the modification of said phase relationship.

33. The method of signaling which consists in generating a plurality of series of radiant electric waves, impressing upon a plurality of said series respectively a plurality of series of periodic variations having a predetermined phase relationship among said plurality of series of variations, selectively receiving said waves and variations in such a manner as to produce a rotating magnetic field and modifying said phase relationship to cause a variation in said field.

34. The method of signaling which consists in generating a plurality of series of electric waves, impressing upon a plurality of said series respectively a plurality of series of periodic amplitude variations having a predetermined phase relationship among said plurality of series of variations, selectively receiving said waves and variations in such a manner as to produce a rotating magnetic field and modifying said phase relationship to cause a variation in said field.

35. The method of signaling which comprises sending a plurality of series of electric waves of relatively high frequency, impressing upon each of said series a series of oscillations of a lower but supersonic frequency, and having a predetermined phase relation among each other, then modifying said phase relation, and causing the operation of an indicating device as a result of the modification of said phase relation.

36. The method of signaling which comprises sending a plurality of series of electric waves of relatively high frequency, differing in frequency from each other by amounts greater than a predetermined amount, impressing upon each of said series a series of oscillations of a lower but supersonic frequency and less than said predetermined amount and having a predetermined phase relation among each other, then modifying said phase relation, and causing the operation of an indicating device as a result of the modification of said phase relation.

37. The method of signaling which consists in generating a plurality of series of electric waves, differing in frequency from each other by amounts each greater than a predetermined amount, impressing upon a plurality of said series respectively a plurality of series of periodic variations having a predetermined phase relationship among said plurality of series of variations, and having a frequency less than said predetermined amount, then modifying said phase relationship, and causing the functioning of a receiving device as a result of the modification of said phase relationship.

38. The method of signaling which consists in generating a plurality of series of electric waves, differing in frequency from each other by amounts each greater than a predetermined amount, impressing upon a plurality of said series respectively a plurality of series of periodic amplitude variations having a predetermined phase relationship among said plurality of series of variations, and having a frequency less than said predetermined amount, then modifying said phase relationship, and causing the functioning of a receiving device as a result of the modification of said phase relationship.

39. The method of signaling which consists in generating a plurality of series of electric waves differing in frequency from each other by amounts each greater than a predetermined amount, impressing upon a plurality of said series respectively a plurality of series of periodic variations having a predetermined phase relationship among said plurality of series of variations and having a frequency less than said predetermined amount, selectively receiving said waves and variations in such a manner as to produce a rotating magnetic field and modifying said phase relationship to cause a variation in said field.

40. The method of signaling which consists of generating a plurality of series of electric waves, differing in frequency from each other by amounts each greater than a predetermined amount, impressing upon a plurality of said series respectively a plurality of series of periodic amplitude variations having a predetermined phase relationship among said plurality of series of variations and having a frequency less than said predetermined amount, selectively receiving said waves and variations in such a manner as to produce a rotating magnetic field and modifying said phase relationship to cause a variation in said field.

41. In a system for the transmission and reception of electrical energy, a transmission station, and means at the transmission station to produce alternating currents of fixed phase relationship, means to continuously vary the degree of phase difference, and a receiving station selectively responsive to the energy emitted from said transmission station, such receiving station including means for reassociating the effects of said current to produce a variable field of force in accordance with a predetermined pattern.

42. In a system for the transmission and reception of electrical energy, a transmission station, and means at the transmission station to produce alternating currents of fixed phase relationship, means to continuously vary the amplitude of said phases differently, and a receiving station selectively responsive to the energy emitted from said transmission station, said receiving station including means for reassociating the effects of said current to produce a variable field of force in accordance with a predetermined pattern.

43. The method of transmitting and receiving electrical energy which consists of emitting electro-magnetic waves by means of alternating currents of radiating frequency of fixed phase relationship and continuously varying the degree of the phase difference differently, selectively receiving the energy of said waves and reassociating the effects of said currents to produce a variable field of force in accordance with a predetermined pattern.

Signed at New York, in the county of New York and State of New York, this 4th day of February, A. D. 1918.

JOHN HAYS HAMMOND, Jr.